(12) United States Patent
Hanada

(10) Patent No.: US 11,569,569 B2
(45) Date of Patent: Jan. 31, 2023

(54) ANTENNA UNIT FOR WORK VEHICLE AND WORK VEHICLE

(71) Applicant: Yanmar Co. Ltd., Osaka (JP)

(72) Inventor: Yosuke Hanada, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 478 days.

(21) Appl. No.: 16/652,069

(22) PCT Filed: Sep. 27, 2018

(86) PCT No.: PCT/JP2018/035891
§ 371 (c)(1),
(2) Date: Mar. 29, 2020

(87) PCT Pub. No.: WO2019/069779
PCT Pub. Date: Apr. 11, 2019

(65) Prior Publication Data
US 2020/0251809 A1    Aug. 6, 2020

(30) Foreign Application Priority Data

Oct. 6, 2017  (JP) .............................. JP2017-195828
Oct. 6, 2017  (JP) .............................. JP2017-195829

(51) Int. Cl.
| | | |
|---|---|---|
| *H01Q 1/32* | (2006.01) | |
| *B60R 11/02* | (2006.01) | |
| *B62D 49/00* | (2006.01) | |
| *G01S 19/36* | (2010.01) | |
| *G05D 1/02* | (2020.01) | |

(52) U.S. Cl.
CPC .......... *H01Q 1/3233* (2013.01); *B60R 11/02* (2013.01); *B62D 49/00* (2013.01); *G01S 19/36* (2013.01); *H01Q 1/3275* (2013.01); *G05D 1/0278* (2013.01); *G05D 2201/0201* (2013.01)

(58) Field of Classification Search
CPC .......................... H01Q 1/3233; H01Q 1/3275
See application file for complete search history.

(56) References Cited

U.S. PATENT DOCUMENTS

| | | |
|---|---|---|
| 2015/0097738 A1 | 4/2015 | Denso |
| 2017/0322550 A1 | 11/2017 | Yanmar |

FOREIGN PATENT DOCUMENTS

| | | |
|---|---|---|
| JP | 2016-002874 | 1/2016 |
| WO | 2016076320 | 5/2016 |

*Primary Examiner* — Graham P Smith
(74) *Attorney, Agent, or Firm* — Chris Mizumoto

(57) ABSTRACT

A GNSS antenna 26 and an inertial measurement unit 25 are placed at a longitudinal center of a unit base 55 mountable onto a work vehicle. A wireless communication unit 27 is placed at the longitudinal one end side of the unit base 55. A wireless communication antenna 28 of the wireless communication unit 27 is placed in a front part of the unit base 55, which is located on the front side of a vehicle body when the unit base 55 is mounted on the work vehicle. The GNSS antenna 26 is provided above the inertial measurement unit 25.

8 Claims, 15 Drawing Sheets

ANTENNA UNIT FOR WORK VEHICLE AND WORK VEHICLE

CROSS-REFERENCE

This application is a national phase of an international application, PCT/JP2018/035891 filed on Sep. 27, 2018, which claims the benefit of Japanese Application No. 2017-195828 filed on Oct. 6, 2017 and Japanese Application No. 2017-195829 filed on Oct. 6, 2017.

TECHNICAL FIELD

The present invention relates to an antenna unit for a work vehicle used in an automatic traveling system or the like for allowing a work vehicle such as a tractor to automatically travel along a target traveling route while acquiring position information of the work vehicle by using a Global Navigation Satellite System (GNSS), and relates to a work vehicle with a cabin, in particular, a work vehicle suitable in automatic traveling (including self-driving) of the work vehicle such as a tractor along a target traveling route while acquiring position information of the work vehicle by using a Global Navigation Satellite System (GNSS).

BACKGROUND ART

For example, in a tractor disclosed in Patent Literature 1 as a work vehicle employing an automatic traveling system, a GPS antenna (GNSS antenna) for acquiring satellite positioning information from a positioning satellite is provided on an upper surface of its cabin roof.

Specifically, on the upper surface of the cabin roof, a mounting stay having a substantially horizontal mounting seat at a higher position than the top surface of the cabin roof is formed in a portion including the intersection of the front-rear direction line at the approximate center of the tread width of the vehicle body and the transverse direction line at the approximate center of the wheel base, and the GPS antenna is mounted on the mounting seat of the mounting stay.

Further, in a case where, as the GPS antenna, a GPS antenna with a gyro sensor is used, the inclination angle of the cabin roof can be detected.

CITATION LIST

Patent Literature

PTL 1: Japanese Unexamined Patent Application Publication No. 2016-002874

DISCLOSURE OF INVENTION

Problems to be Solved by the Invention

The above-described conventional technique discloses a technique for improving the detection accuracy of the GPS antenna or the detection accuracy of both the GPS antenna and the gyro sensor by elaborating the mounting position of the GPS antenna on the upper surface of the cabin roof.

However, the above-described automatic traveling system is provided with various types of external devices separately from the work vehicle, such as a wireless communication terminal that issues various instructions to the work vehicle and a base station that acquires position information of the work vehicle.

Therefore, when automatic traveling of the work vehicle is actually performed, it is necessary to efficiently mount, on the work vehicle, not only the GPS antenna but also various types of antenna devices for communicating between the work vehicle and external devices. In this respect, the above-described conventional technique has room for improvement.

In addition, in the above-described conventional technique, the upper surface of the cabin roof provided at the upper part of the cabin frame has many curves and is also less rigid than the cabin frame. Accordingly, it is necessary to reinforce the mounting stay on which the GPS antenna is mounted without impairing the appearance of the cabin roof. Also in this respect, the conventional technique has room for improvement.

In view of such a situation, a main object of the present invention is to provide an antenna unit for a work vehicle by which various types of antenna devices effective for automatic traveling and the like of the work vehicle can be efficiently installed in the work vehicle.

Further, a main object of the present invention is to provide a work vehicle capable of mounting various types of antenna devices effective for automatic traveling and the like of the work vehicle and securely supporting various types of antenna devices.

Means for Solving the Problems

A first characteristic configuration of the present invention is that a GNSS antenna and an inertial measurement unit are placed at a longitudinal center of a unit base mountable onto a work vehicle; a wireless communication unit is placed at one end side in a longitudinal direction of the unit base; a wireless communication antenna of the wireless communication unit is placed in a front part of the unit base, which is located on a front side of a vehicle body when the unit base is mounted on the work vehicle; and the GNSS antenna is provided above the inertial measurement unit.

Since the GNSS antenna and the inertial measurement unit are placed at the longitudinal center of the unit base mountable on the work vehicle, for example, when the unit base is mounted onto the work vehicle in the left-right direction with satisfactory balance, the longitudinal center of the unit base is placed at the center position in the left-right direction of the work vehicle. This allows the GNSS antenna and the inertial measurement unit to be placed at the center position in the left-right direction of the work vehicle, and accordingly makes it possible to improve both the detection accuracy of the current position information of the work vehicle acquired from a reception signal of the GNSS antenna and the detection accuracy of posture change information of the vehicle body acquired from the inertia measurement unit.

Further, the wireless communication unit placed on one end side in the longitudinal direction of the unit base enables a wireless communication with an external device such as a wireless communication terminal with various types of signals.

In addition, since the wireless communication antenna of the wireless communication unit is placed at one end side in the longitudinal direction of the unit base placed apart from the inertial measurement unit, a sufficient distance can be secured between the wireless communication antenna of the wireless communication unit and the center of the inertial measurement unit. Further, since the wireless communication antenna of the wireless communication unit is placed in the front part of the unit base, which is the front side of the vehicle body when the unit base is mounted on the work vehicle, a sufficient distance can be secured in the front-rear direction between a metal component such as the cabin frame of the work vehicle and the wireless communication antenna of the wireless communication unit, in a state where the unit base is mounted on the work vehicle. This suppresses radio interference between the wireless communication unit and the inertial measurement unit, and makes it less susceptible to radio wave shielding by metal components of the work vehicle. Accordingly, it is possible to reduce factors of a communication failure between the wireless communication unit and the wireless communication terminal.

Therefore, rational elaboration of the installation positions and orientation postures of the GNSS antenna, the inertial measurement unit, and the wireless communication antenna of the wireless communication unit with respect to the unit base as described above makes it possible to improve both the detection accuracy of the inertial measurement unit and the detection accuracy of the GNSS antenna with a reduced size of the antenna unit itself, and allows them to be efficiently installed in the work vehicle with a satisfactory communication of the wireless communication unit maintained.

A second characteristic configuration of the present invention is that a plurality of the wireless communication antennas are placed in the front part of the unit base and in parallel in the longitudinal direction of the unit base.

With the above configuration, the plurality of wireless communication antennas of the wireless communication unit make it possible to increase the speed of communication with an external device such as a wireless communication terminal. In addition, since the plurality of wireless communication antennas are placed in parallel in the front part of the unit base and in the longitudinal direction of the unit base, it is less likely for all the wireless communication antennas to be affected by radio wave shielding by a metal component such as the cabin frame of the work vehicle, so that a satisfactory communication of the wireless communication unit can be maintained.

A third characteristic configuration of the present invention is that a distance between the GNSS antenna and an inner surface of a unit cover configured to cover the unit base is set to 30 mm or more.

With the above configuration, it is possible to suppress radio interference due to the close proximity between the GNSS antenna and the inner surface of the unit cover, thereby improving the detection accuracy of the current position information of the work vehicle acquired from a reception signal of the GNSS antenna.

A fourth characteristic configuration of the present invention is that a base station antenna configured to receive information from a reference station is placed on the other end side in the longitudinal direction of the unit base, and a raising part configured to place the base station antenna in a higher place than an antenna mounting part of the unit base is provided between the base station antenna and the antenna mounting part.

With the above configuration, an upper end part of the base station antenna can be placed in a higher place by the height of the raising part, and thus it is possible to improve the reception performance with respect to the reference station while preventing the base station antenna from breaking due to swinging caused by traveling vibration and the like of the work vehicle, as compared with a case where a long base station antenna is used.

A fifth characteristic configuration of the present invention is that a mounting space for another unit is formed on the other end side in the longitudinal direction of the unit base.

With the above configuration, it is possible to easily mount another unit such as a retrofit controller configured to control, for example, a part of the automatic traveling control by using a mounting space secured on the other end side in the longitudinal direction of the unit base. In addition, it is possible to efficiently and compactly store, in the antenna unit, such other unit mounted later.

A sixth characteristic configuration of the present invention is that, in a work vehicle with a cabin, a support frame extending in a left-right width direction at an upper position outside the cabin is fixed to brackets extending upward from both right and left sides of a cabin frame, and an antenna unit in which an inertial measurement unit, a GNSS antenna, and a wireless communication device are built is built in the support frame in a state where the inertial measurement unit and the GNSS antenna are placed at a substantially center position in a left-right width direction of a vehicle body, and that the antenna unit is configured as an antenna unit for a work vehicle according to the present invention.

With the above configuration, since the inertial measurement unit and the GNSS antenna which are built in the antenna unit are placed at the substantially center position in the left-right width direction of the vehicle body, it is possible to improve both the detection accuracy of the current position information of the work vehicle acquired from a reception signal of the GNSS antenna and the detection accuracy of the posture change information of the vehicle body acquired from the inertial measurement unit.

Further, the wireless communication device built in the antenna unit enables a wireless communication with an external device such as a wireless communication terminal with various types of signals.

In addition, the support frame on which the antenna unit is mounted is mounted on the brackets extending upward from both right and left sides of the cabin frame. In that mounting state, the support frame is fixed to the rigid cabin frame in a posture along the left-right width direction at the upper position outside the cabin. This makes it possible to configure the support frame and both brackets to have a strong support structure integrated with the cabin frame.

Further, the cabin frame has a height close to the cabin roof, and the brackets extend upward from both left and right sides of the cabin frame. This allows a mounting position of the support frame to be set to an upper side of the cabin frame with a simple support structure, and makes it possible to easily place the antenna unit at a height position where the inertial measurement unit, the GNSS antenna, and the wireless communication device function properly.

Therefore, the adoption of the antenna unit in which the inertial measurement unit, the GNSS antenna, and the wireless communication device are built, the installation position of the inertial measurement unit and the GNSS antenna with respect to the vehicle body, and the above-described rational elaboration in the support structure of the antenna unit make it possible to improve both the detection accuracy of the inertial measurement unit and the detection accuracy of the GNSS antenna and allow them to be efficiently installed in the work vehicle with a satisfactory communication of the wireless communication device maintained. In addition, it is possible to configure a strong support structure of the installed antenna unit.

A seventh characteristic configuration of the present invention is that the antenna unit is mounted to be displaceable from a working position to a non-working position on a lower front side with respect to the support frame, and a guide unit configured to guide the antenna unit to be moved in a front-rear direction between the working position and the non-working position is provided.

With the above configuration, in a state where the antenna unit is in the working position, for example, it is preferable that the antenna unit or the antenna included in the antenna unit is placed to protrude upward from the highest part of the top surface of the cabin roof so that the inertial measurement unit, the GNSS antenna, and the wireless communication device in the antenna unit function properly. However, in this case, the height of a transport vehicle such as a truck to transport the work vehicle is high, and thus, there may be a problem that the vehicle is subject to height restrictions in traveling on a road or the like. Therefore, in the present invention, when the antenna unit from the working position to the non-working position on the lower front side with respect to the support frame, it is possible to easily cope with the problem such as the height restrictions in traveling on a road.

In addition, since the antenna unit is moved forward along the guide unit when the antenna unit is displaced from the working position to the non-working position, it is possible to place the antenna unit in the non-working position by using a large space in the front upper part of the cabin.

An eighth characteristic configuration of the present invention is that the antenna unit is mounted to be displaceable from a working position to a non-working position on a lower side with respect to the support frame, and the antenna unit is placed at a position substantially equal to or lower than a highest part of a top surface of the cabin in a state where the antenna unit is displaced to the non-working position on the lower side.

With the above configuration, in a state where the antenna unit is in the working position, for example, it is preferable that the antenna unit or the antenna included in the antenna unit is placed to protrude upward from the highest part of the top surface of the cabin roof so that the inertial measurement unit, the GNSS antenna, and the wireless communication device in the antenna unit function properly. However, even in this case, since the antenna unit is placed at the position substantially equal to or lower than the highest part of the top surface of the cabin when the antenna unit is displaced to the non-working position, it is possible to easily cope with the problem such as height restrictions in traveling on a road when the work vehicle is transported by a transport vehicle such as a truck.

DESCRIPTION OF EMBODIMENTS

Embodiments of the present invention will be described with reference to the drawings.

Figure 1:
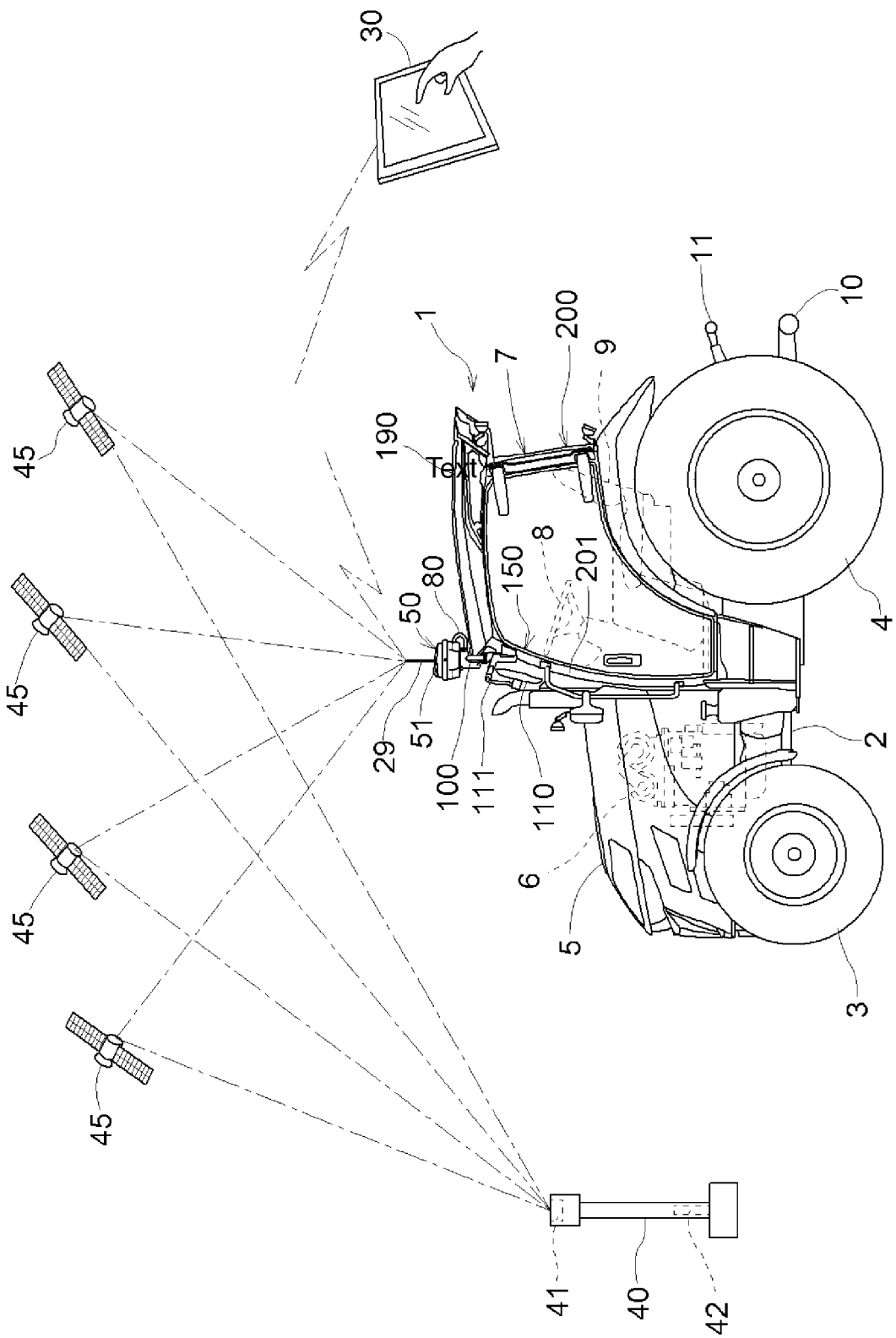
FIG. 1 is an overall side view of a tractor equipped with an antenna unit.
Figure 2:
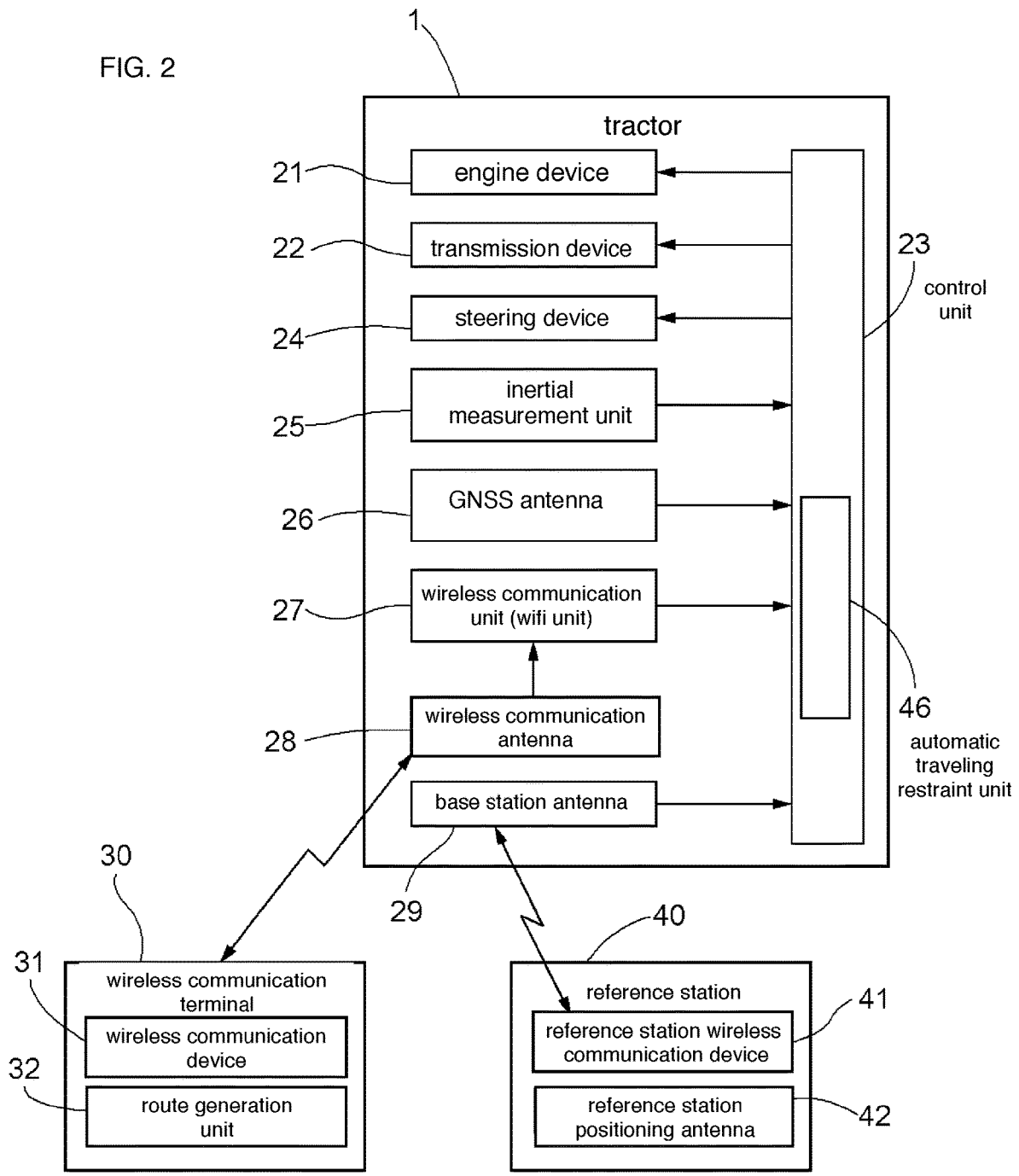
FIG. 2 is a control block diagram of a tractor, a reference station, and a wireless communication terminal.

An automatic traveling system illustrated in FIGS. 1 and 2 uses an antenna unit 50 for a work vehicle, and is configured to generate a target traveling route, and enable a tractor 1 serving as a work vehicle to automatically travel along the generated target traveling route. The automatic traveling system includes, in addition to the tractor 1 capable of automatic traveling, a wireless communication terminal 30 configured to issue various types of instructions to the tractor 1 and a reference station 40 configured to acquire position information of the tractor 1.

First, the tractor 1 will be described with reference to FIG. 1.

The tractor 1 includes a vehicle body unit 2 configured to mount a ground work machine (not illustrated) on the rear side, a front part of the vehicle body unit 2 is supported by a pair of left and right front wheels 3, and a rear part of the vehicle body unit 2 is supported by a pair of left and right rear wheels 4. A hood 5 is placed in the front part of the vehicle body unit 2, and an engine 6 serving as a drive source is housed inside the hood 5. A cabin 7 for a driver to ride is provided on the rear side of the hood 5, and a steering handle 8 for the driver to perform a steering operation, a driver's seat 9 for the driver, and the like are provided in the cabin 7.

The engine 6 can be constructed of, for example, a diesel engine, but is not limited to this, and may be constructed of, for example, a gasoline engine. Further, an electric motor may be employed as a drive source in addition to or instead of the engine 6.

Further, in the present embodiment, the tractor 1 will be described as a work vehicle by way of example, but examples of the work vehicle include, in addition to the tractor, riding type of work vehicles such as a rice transplanter, a combine, a civil engineering/construction work device, and a snowplow.

On the rear side of the vehicle body unit 2, a three-point link mechanism including a pair of left and right lower links 10 and an upper link 11 is provided so that a ground work machine is mountable on the three-point link mechanism. Although not illustrated, on the rear side of the vehicle body unit 2, a lifting device including a hydraulic device such as a lifting cylinder is provided, and the lifting device raises and lowers the three-point link mechanism to raises and lowers the ground work machine.

Examples of the ground work machine include a tilling device, a plow, and a fertilizer applying device.

As illustrated in FIG. 2, the tractor 1 includes an engine device 21 configured to adjust the rotation speed of the engine 6, a transmission device 22 configured to change a rotational driving force from the engine 6 and transmit the rotational driving force to driving wheels, and a control unit 23 configured to control the engine device 21 and the transmission device 22. The transmission device 22 is constructed from, for example, a combination of a main transmission device including a hydraulic continuously variable transmission device and an auxiliary transmission device including a gear-type multi-stage transmission device.

The tractor 1 is configured not only to allow the driver to ride in the cabin 7 to travel, but also to allow the tractor 1 itself to automatically travel based on, for example, an instruction from the wireless communication terminal 30 without a driver riding in the cabin 7.

As illustrated in FIG. 2, the tractor 1 includes a steering device 24, an inertial measurement unit (IMU) 25 configured to obtain posture change information of the vehicle body, a GNSS antenna 26 configured to receive a radio signal transmitted from a positioning satellite (navigation satellite) 45 included in a Global Navigation Satellite System (GNSS), a wireless communication unit (an example of a wireless communication device built in the antenna unit 50) 27 configured to transmit and receive various types of signals via a wireless communication network established between the wireless communication unit 27 and the wireless communication terminal 30 and the like, a base station antenna (an example of a wireless communication device built in the antenna unit 50) 29 configured to receive a wireless signal (e.g., a wireless signal with a frequency band of 920 MHz) from a reference station wireless communication device 41 of the reference station 40, and the like. As a result, the tractor 1 is configured to automatically travel while acquiring its own current position information (position information of the vehicle body unit 2).

Figure 3:
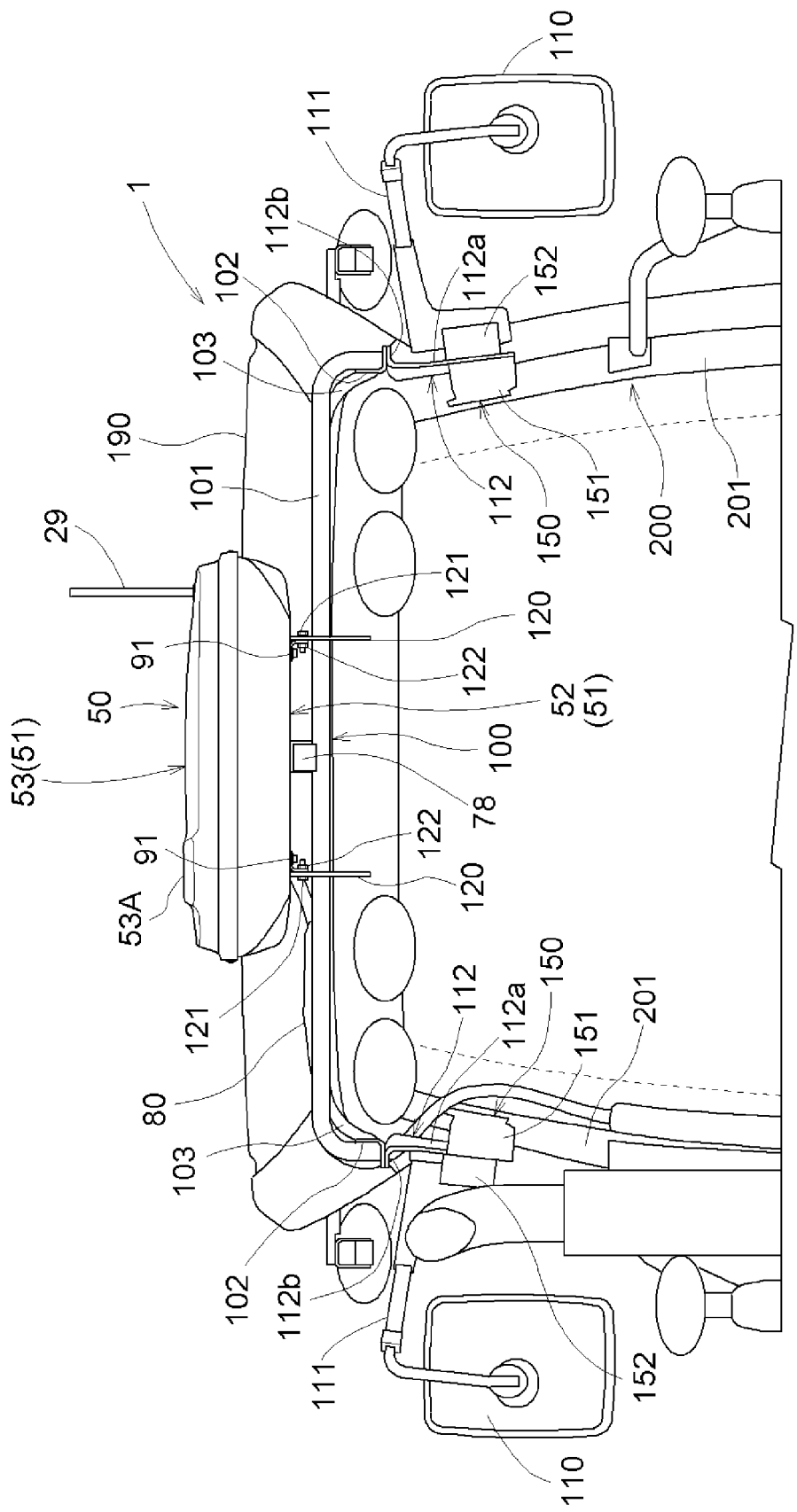
FIG. 3 is a front view of an antenna unit mounting part of the tractor.
Figure 4:
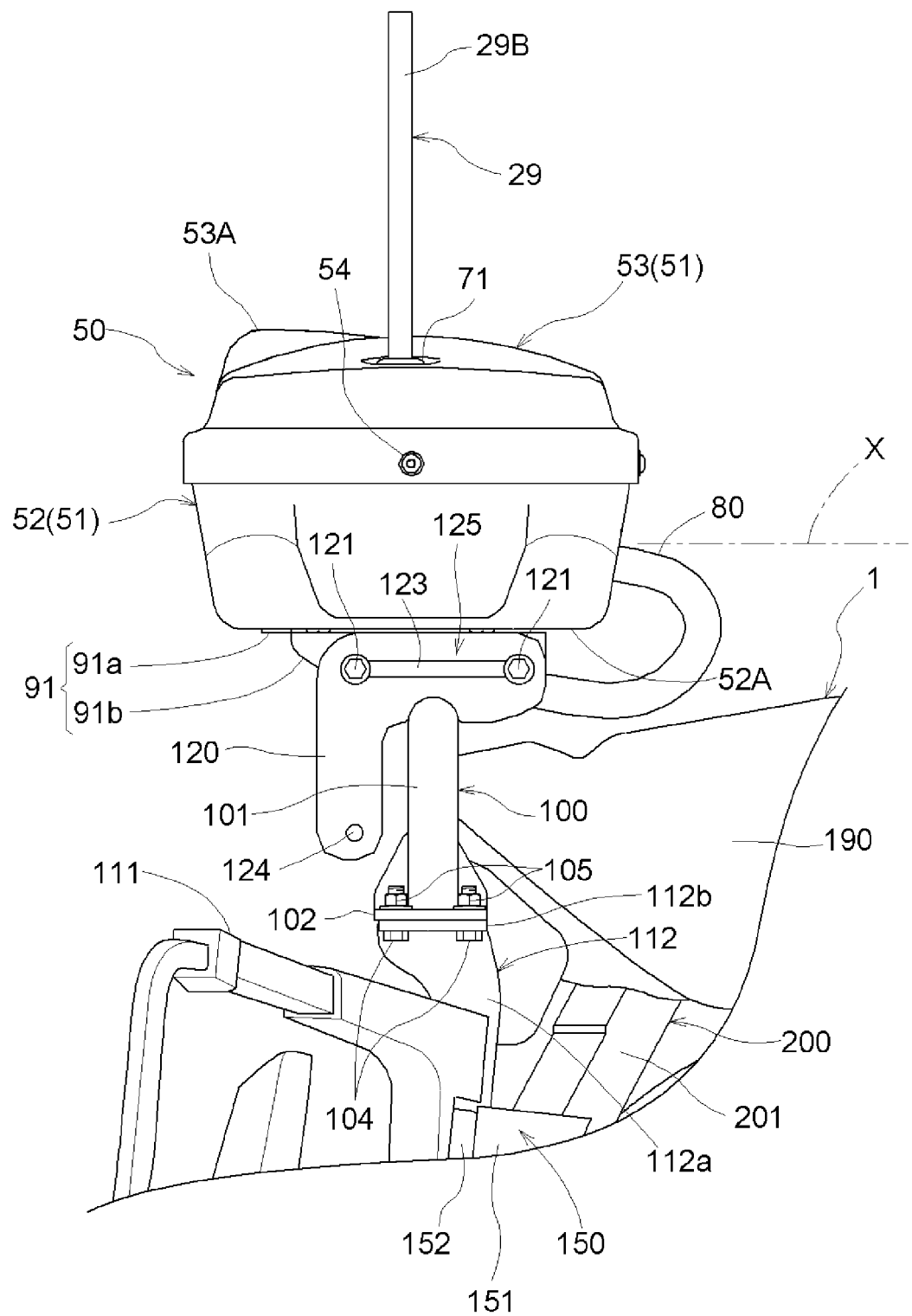
FIG. 4 is a side view of the antenna unit mounting part of the tractor.
Figure 5:
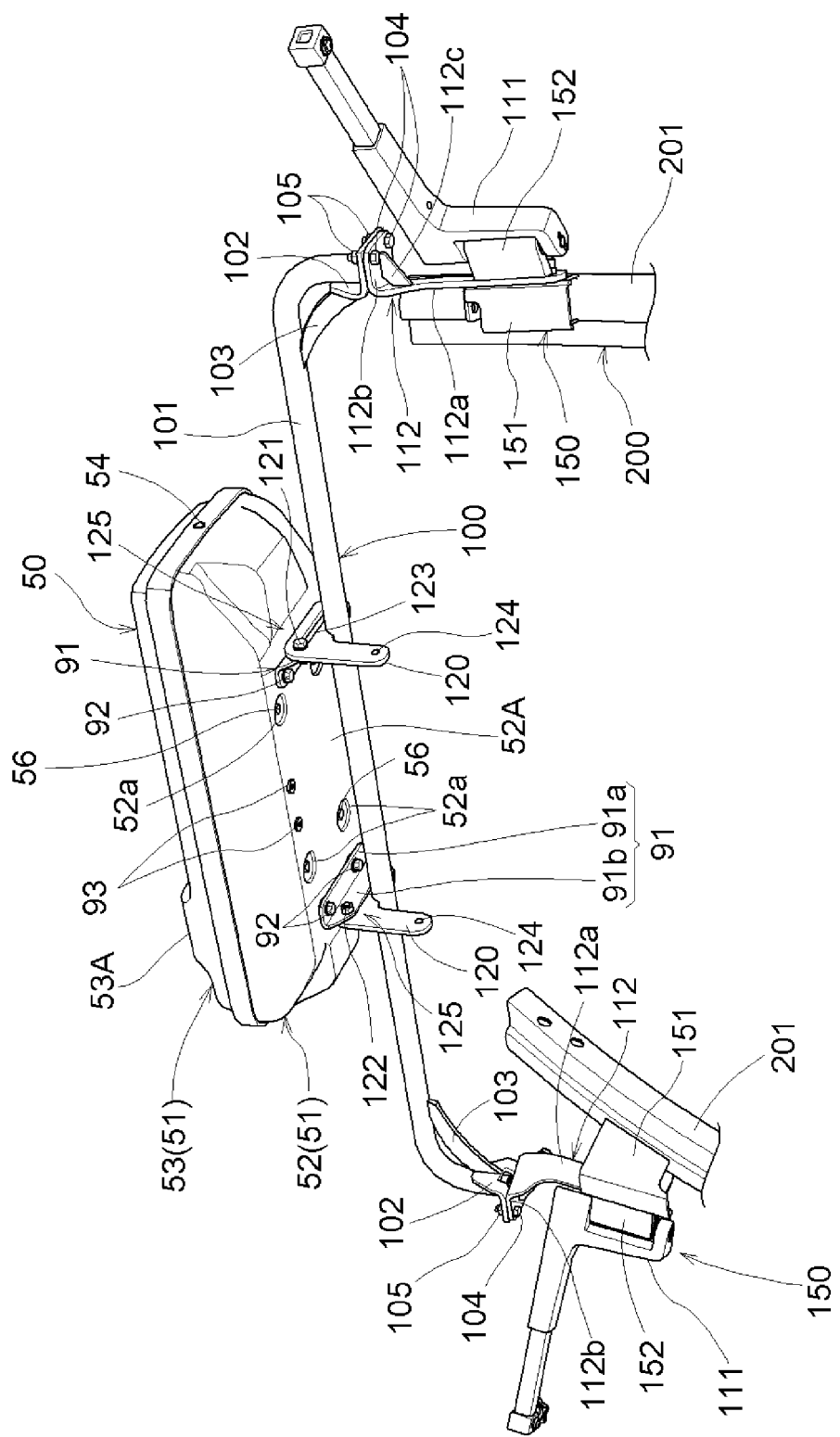
FIG. 5 is a perspective view of the antenna unit mounting part of the tractor.

The inertial measurement unit 25, the GNSS antenna 26, the wireless communication unit 27, and the base station antenna 29 are housed in the antenna unit 50 with a unit cover 51 as illustrated in FIGS. 6 to 9. As illustrated in FIGS. 3 to 5, the antenna unit 50 is mounted on a support frame 100, which is fixed to a cabin frame 200 of the cabin 7 and arranged along the left-right width direction, at an upper position on the front side outside the cabin 7.

It is noted that a specific internal arrangement structure and mounting structure of the antenna unit 50 will be described in detail after the description of the automatic traveling system.

The steering device 24 is provided, for example, in the middle of the rotation shaft of the steering handle 8 and is configured to adjust the rotation angle (steering angle) of the steering handle 8. The control unit 23 controlling the steering device 24 adjusts the rotation angle of the steering handle 8 to a desired rotation angle to perform not only straight traveling but also turn traveling with a desired turning radius.

The inertial measurement unit 25 obtains a three-dimensional angular velocity and an acceleration with a three-dimensional gyro and a three-directional accelerometer. A detection value of the inertial measurement unit 25 is input to the control unit 23, and the control unit 23 operates the value by using a posture and azimuth operation means to calculate posture information (an azimuth angle (yaw angle) of the tractor 1, a tilt angle in the left-right direction (roll angle) of the vehicle body of the tractor 1, and a tilt angle in the front-rear moving direction (pitch angle) of the vehicle body of the tractor 1.

In the Global Navigation Satellite System (GNSS), as the positioning satellite 45, the GPS (US) may be employed, but a satellite positioning system such as a quasi-zenith satellite (Japan) or a GLONASS satellite (Russia) may also be employed.

In the present embodiment, the wireless communication unit 27 is composed of a Wi-Fi unit with a frequency band of 2.4 GHz, but the wireless communication unit 27 may use Bluetooth (registered trademark) other than Wi-fi. As illustrated in FIG. 2, a signal received by a wireless communication antenna 28 of the wireless communication unit 27 may be input to the control unit 23, and a signal from the control unit 23 is configured to be transmitted by the wireless communication antenna 28 to a wireless communication device 31 of the wireless communication terminal 30 or the like.

Here, for a positioning method using the satellite positioning system, a positioning method of obtaining a current position of the tractor 1 is applicable, in the positioning method, the reference station 40 installed at a predetermined reference point is provided, and correction information from the reference station 40 and satellite positioning information of the tractor 1 (mobile station) are used. For example, various types of positioning methods such as a differential GPS positioning (DGPS) and a real-time kinematic positioning (RTK positioning) are applicable.

In the present embodiment, for example, the RTK positioning is applied, and as illustrated in FIGS. 1 and 2, in addition to including the GNSS antenna 26 in the tractor 1 being the mobile station side, the reference station 40 including a reference station positioning antenna 42 is provided. The reference station 40 is placed at a position (reference point) where the traveling of the tractor 1 is not hindered, such as an area around a farm field. Position information of the reference point being an installation position of the reference station 40 is obtained in advance. The reference station 40 includes the reference station wireless communication device 41 configured to transmit and receive various types of signals to and from the base station antenna 29 of the tractor 1. As a result, the reference station 40 is configured to transmit and receive a variety of information to and from the tractor 1.

In the RTK positioning, both the reference station positioning antenna 42 of the reference station 40 installed at the reference point and the GNSS antenna 26 of the tractor 1 being the mobile station side whose position information is to be obtained measure a carrier phase (satellite positioning information) from the positioning satellite 45. The reference station 40 generates correction information including the measured satellite positioning information and the position information of the reference point each time the satellite positioning information is measured from the positioning satellite 45 or each time a set period elapses, and transmits the correction information from the reference station wireless communication device 41 to the base station antenna 29 of the tractor 1. The control unit 23 of the tractor 1 obtains the current position information of the tractor 1 by using the satellite positioning information measured by the GNSS antenna 26 and the correction information transmitted from the reference station 40. The control unit 23 obtains, for example, latitude information and longitude information as the current position information of the tractor 1.

The automatic traveling system includes, in addition to the tractor 1 and the reference station 40, the wireless communication terminal 30 configured to issue an instruction to cause the tractor 1 to automatically travel, to the control unit 23 of the tractor 1. The wireless communication terminal 30 is composed of, for example, a tablet-type personal computer having a touch panel, is configured to display a variety of information on the touch panel, and also to receive an input of a variety of information through an operation on the touch panel. The wireless communication terminal 30 includes the wireless communication device 31 and a route generation unit 32 configured to generate a target traveling route. The route generation unit 32 generates the target traveling route where the tractor 1 automatically travels based on the variety of information input through the touch panel.

The control unit 23 included in the tractor 1 is configured to transmit and receive a variety of information to and from the wireless communication terminal 30 via a wireless communication network established with the wireless communication device 31 or the like. The wireless communication terminal 30 is configured to issue an instruction for the tractor 1 to automatically travel by transmitting a variety of information for causing the tractor 1 to automatically travel, such as the target traveling route, to the control unit 23 of the tractor 1. The control unit 23 of the tractor 1 is configured to obtain the current position information of the tractor 1 acquired from a reception signal of the GNSS antenna 26 so that the tractor 1 automatically travels along the target traveling route generated by the route generation unit 32, obtain displacement information and azimuth information of the vehicle body from the inertial measurement unit 25, and control the transmission device 22, the steering device 24, and the like based on the current position information, the displacement information, and the azimuth information.

Next, an internal arrangement structure of the antenna unit 50 will be described.

Figure 6:
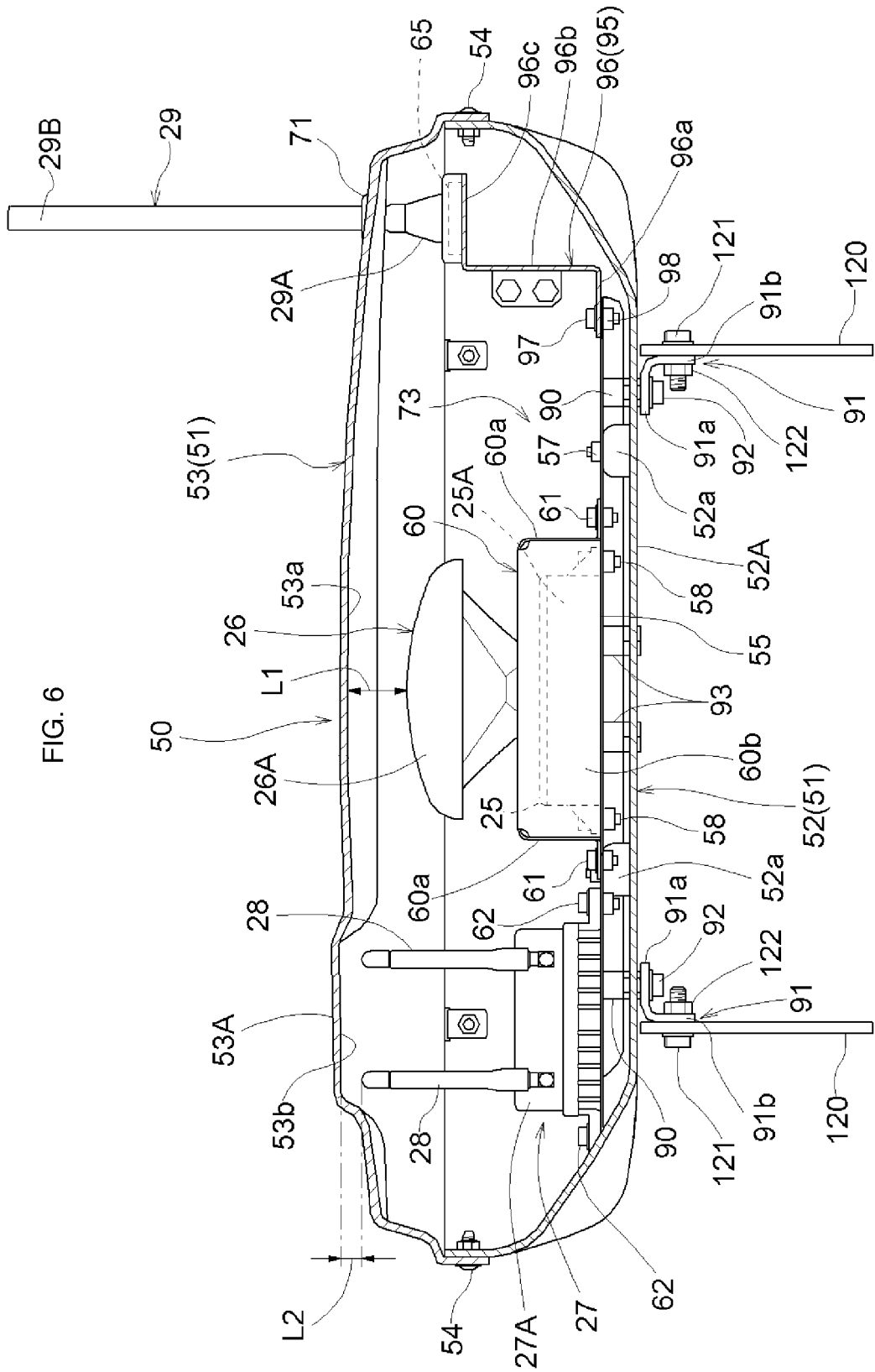
FIG. 6 is a longitudinal sectional view of the antenna unit as viewed from the front.
Figure 7:
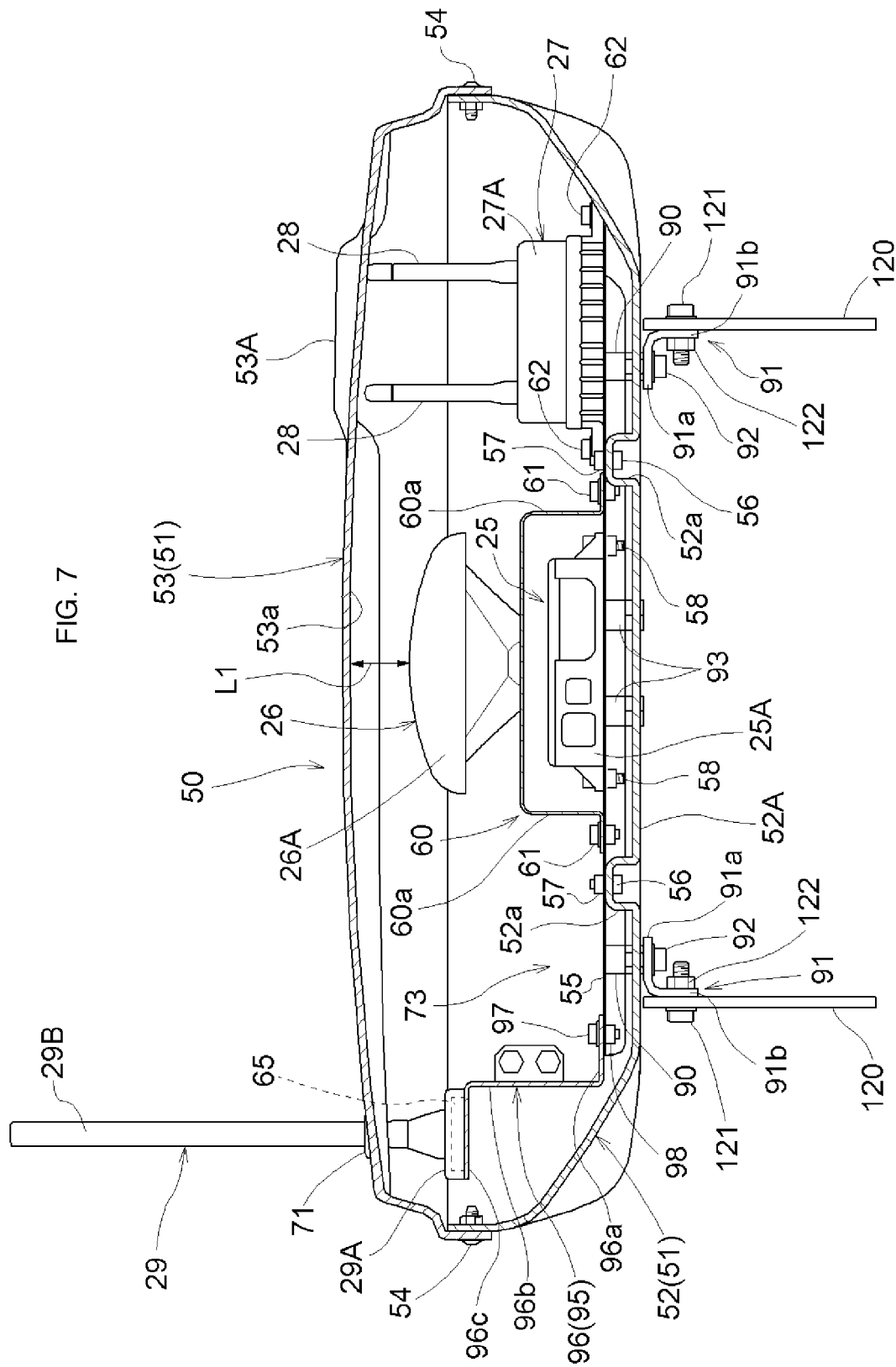
FIG. 7 is a longitudinal sectional view of the antenna unit as viewed from the rear.
Figure 8:
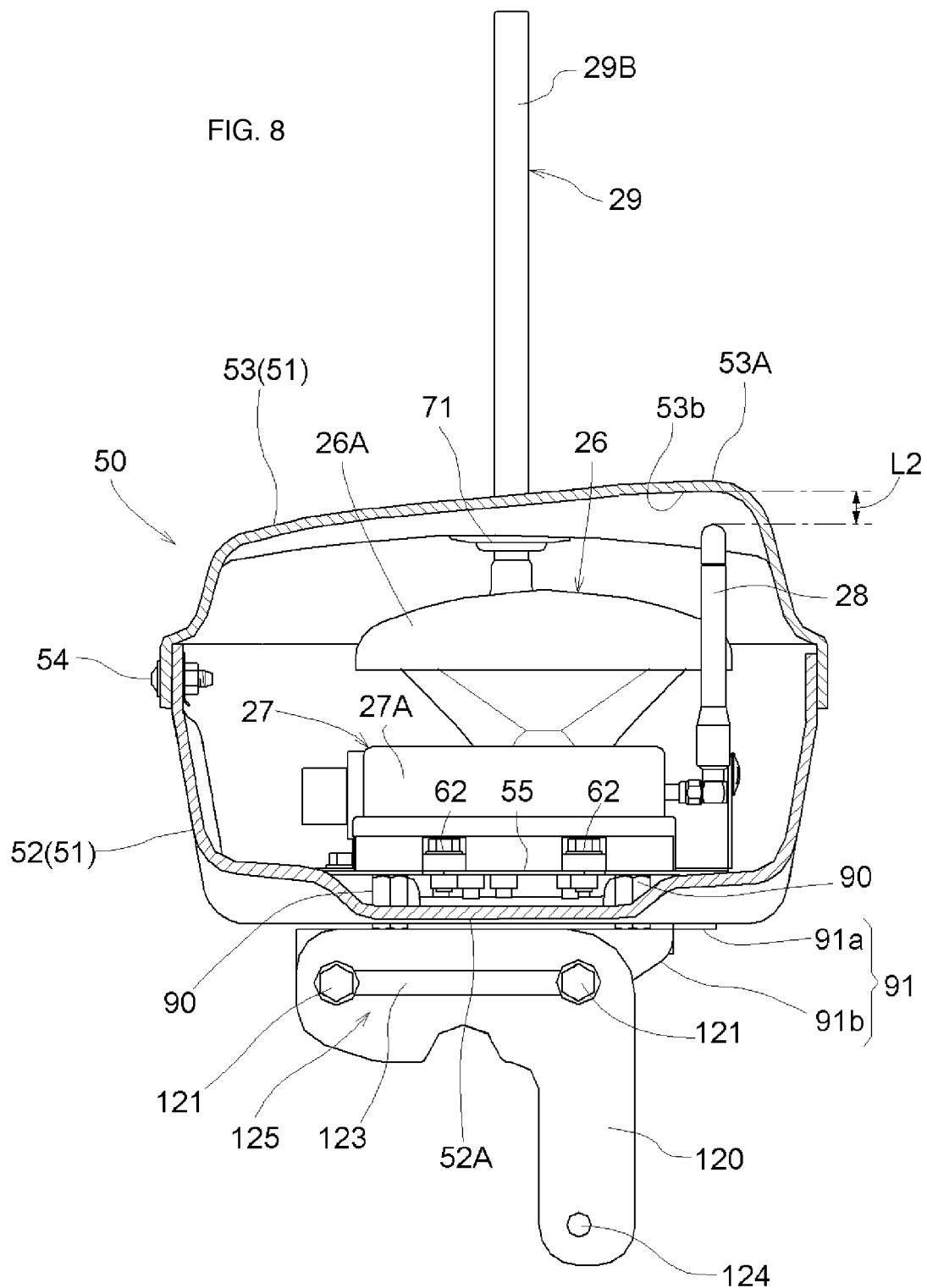
FIG. 8 is a cross-sectional view of the antenna unit as viewed from the right side.
Figure 9:
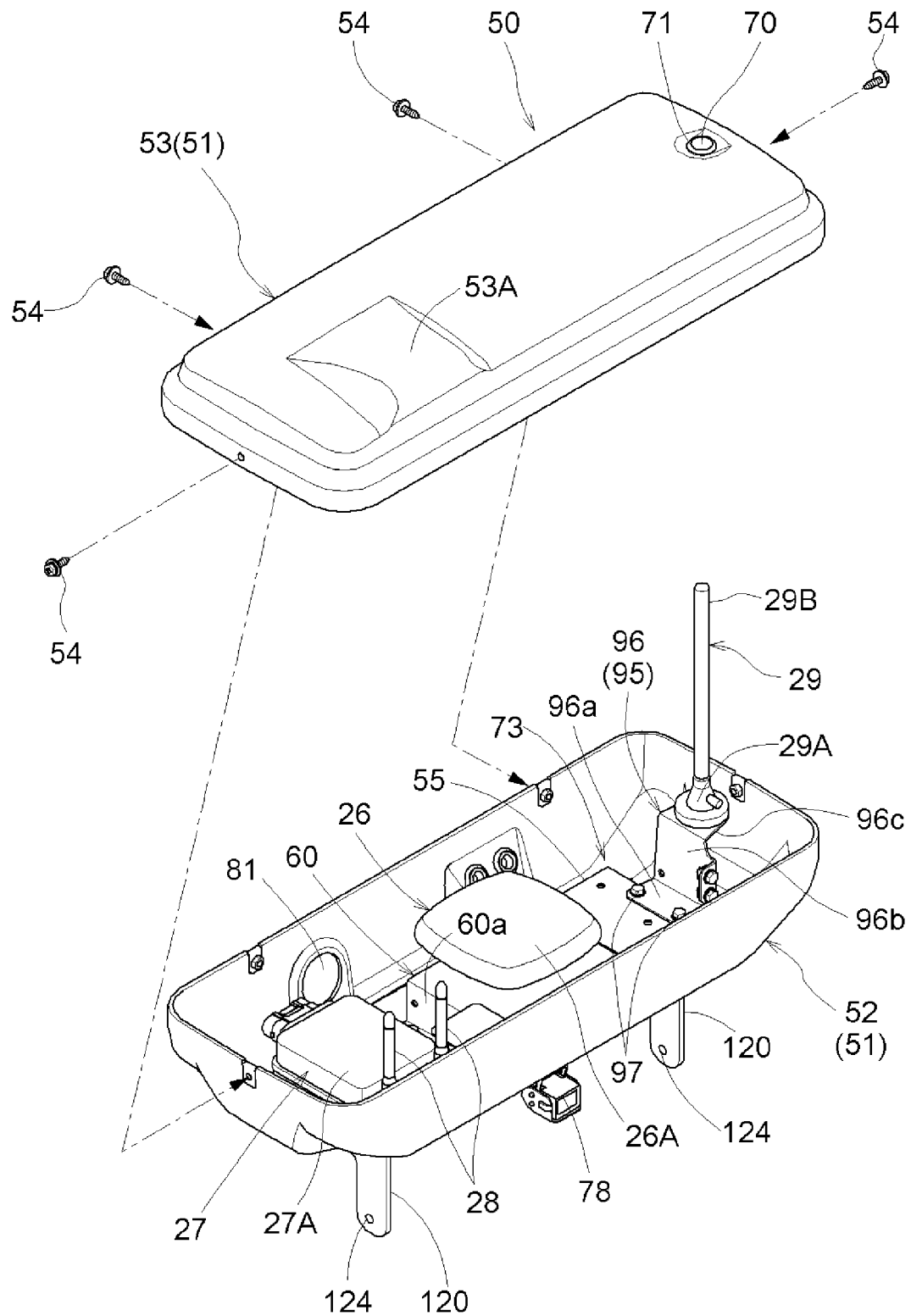
FIG. 9 is a perspective view of the antenna unit with a cover separated.

FIG. 6 is a longitudinal sectional view of the antenna unit 50 as viewed from the front side, FIG. 7 is a longitudinal sectional view of the antenna unit 50 as viewed from the rear side, FIG. 8 is a cross-sectional view of the antenna unit 50 as viewed from the right side, and FIG. 9 is a perspective view when an upper cover body 53 of the unit cover 51 is separated.

The unit cover 51 of the antenna unit 50 is mounted on the tractor 1 in a posture such that the left-right width direction of the vehicle body unit 2 with respect to the forward direction is in the longitudinal direction. As illustrated in FIGS. 6 to 9, the unit cover 51 includes a lower cover body 52 which is made of resin, has a substantially rectangular shape in a plan view, and the upper side of which is opened, and the upper cover body 53 which is made of resin, has a substantially rectangular shape, and the lower side of which is opened. An opening joint part of the upper cover body 53 is externally fitted and detachably joined to an opening joint part of the lower cover body 52 in a watertight manner. As illustrated in FIG. 9, the opening joint part of the upper cover body 53 and the opening joint part of the lower cover body 52 are fixedly coupled by screws 54 in one place on each of the left and right side walls and two places in the left and right direction on the rear wall.

As illustrated in FIGS. 6 to 9, a base plate 55 made of metal, which is an example of a unit base configured to be mounted on the tractor 1, is mounted on the upper surface of a bottom plate part 52A of the lower cover body 52. The base plate 55 is made of a sheet metal having a substantially rectangular shape in a plan view, and is mounted on the lower cover body 52 in a posture such that the left-right width direction of the vehicle body unit 2 with respect to the forward direction is the longitudinal direction. A gap is formed as a set interval between the lower surface of the base plate 55 and the upper surface of the bottom plate part 52A of the lower cover body 52. As illustrated in FIGS. 5 to 7, mounting recesses 52a protruding inward to a position where the bottom plate part 52A can contact the lower surface of the base plate 55 are formed in a plurality of places (four places in the present embodiment) of the bottom plate part 52A of the lower cover body 52, and the gap is defined to the set interval by the lower surface of the base plate 55 placed on the upper surface of the mounting recesses 52a. Each of the mounting recess 52a of the bottom plate part 52A of the lower cover body 52 and the base plate 55 are fixedly coupled to each other by a first bolt 56 and a first nut 57.

As illustrated in FIGS. 6 and 7, to the lower surface of the base plate 55, first cylindrical screw members 90 for mounting the base plate 55 on the support frame 100 on the tractor 1 side are fixed in two places which are positioned apart from each other outward in the longitudinal direction on each of the front and rear sides with respect to a central mounting region of the inertial measurement unit 25 and the GNSS antenna 26 described later. The lower end of each of the first screw members 90 penetrates the bottom plate part 52A of the lower cover body 52 and slightly protrudes downward. Among them, at the lower ends of a pair of front and rear first screw members 90 located at one end side in the longitudinal direction of the base plate 55 and the lower ends of a pair of front and rear first screw members 90 located at the other end side in the longitudinal direction, horizontal coupling plate parts 91a of a pair of left and right coupling members 91 that are bent and formed in a substantially inverted "L"-shape when viewed from the front of the vehicle body are placed. The horizontal coupling plate parts 91a of both the coupling members 91 are fixedly coupled by second bolts 92 that penetrate the horizontal coupling plate parts 91a and are screwed into the respective first screw members 90 from below. In this fixed coupling state, it is configured such that a gap is formed between the lower surface of the bottom plate part 52A of the lower cover body 52 and the upper surface of the horizontal coupling plate part 91a of the coupling members 91 so that the load on the base plate 55 side is not applied to the lower cover body 52.

As illustrated in FIGS. 6 and 7, in two left and right places on the lower surface of the base plate 55 in the front end part at the center in the longitudinal direction (the front end part of the base plate 55 which is on the front side of the vehicle body unit 2 when it is mounted on the tractor 1), cylindrical second screw members 93 for mounting a camera 78 (see FIGS. 3 and 9) for capturing an image of an area in front of the vehicle body are fixed. The lower end of each of the second screw members 93 penetrates the bottom plate part 52A of the lower cover body 52 and protrudes slightly downward. A mounting bracket (not illustrated) for the camera 78 (see FIGS. 3 and 9) placed at the lower ends of the second screw members 93 is fixedly coupled by bolts (not illustrated) screwed into the second screw members 93 from below. It is configured such that, in this fixed coupling state, a gap is formed between the lower surface of the bottom plate part 52A of the lower cover body 52 and the upper surface of the mounting bracket for the camera 78 so that the load on the camera 78 side is not applied to the lower cover body 52.

As illustrated in FIGS. 6, 7, and 9, at the center in the longitudinal direction of the base plate 55, the inertial measurement unit 25 and the GNSS antenna 26, which are placed at the center position or substantially the center position in the left-right width direction of the vehicle body unit 2, are provided in a state where the inertial measurement unit 25 and the GNSS antenna 26 are overlapped with each other vertically. Among the inertial measurement unit 25 and the GNSS antenna 26, the GNSS antenna 26 is placed at a position above the inertial measurement unit 25.

Specifically, as illustrated in FIGS. 6 and 7, a housing 25A of the inertial measurement unit 25 is fixedly coupled to the base plate 55 by third bolts 58 in a state where the center position in the left-right direction of the housing 25A is located at the center position in the longitudinal direction of the base plate 55.

On the other hand, as illustrated in FIGS. 6 and 7, a housing 26A of the GNSS antenna 26 is mounted on the base plate 55 via a metal hat-shaped first bracket 60 in a state where the center position in the left-right direction of the housing 26A is located at the center position in the longitudinal direction of the base plate 55. The first bracket 60 is formed in a hat shape detouring above the housing 25A of the inertial measurement unit 25 along the longitudinal direction of the base plate 55. Both leg portions 60a of the hat-shaped first bracket 60 are fixedly coupled to the base plate 55 by fourth bolts 61. The width of the hat-shaped first bracket 60 in the front-rear direction (also the front-rear direction of the vehicle body) is set to be slightly larger than the front-rear width of the housing 25A of the inertial measurement unit 25, and as illustrated in FIG. 6, a front plate 60b covering the front side of the inertial measurement unit 25 is formed in a bent shape at the front edge of the first bracket 60. With this configuration, the first bracket 60 is configured as a shielding wall shielding between the first bracket 60 and the wireless communication unit 27 described later.

Further, as illustrated in FIGS. 6 and 7, a first predetermined distance L1 between the GNSS antenna 26 mounted on the first bracket 60 and an inner surface 53a of the upper cover body 53 of the unit cover 51 at the center in the longitudinal direction is set to 30 mm or more.

With the arrangement of the inertial measurement unit 25 and the GNSS antenna 26 described above, the inertial measurement unit 25 and the GNSS antenna 26 are placed vertically at the center position or substantially the center position in the left-right width direction of the vehicle body unit 2 in a state where the antenna unit 50 is mounted on the tractor 1 as illustrated in FIGS. 3, 6, and 7. Accordingly, it is possible to improve both the detection accuracy of the current position information of the tractor 1 acquired from the reception signal of the GNSS antenna 26 and the detection accuracy of the displacement information and the azimuth information of the vehicle body acquired from the inertial measurement unit 25. In addition, the width of the unit cover 51 in the front-rear direction is reduced, which makes the antenna unit 50 more compact.

Moreover, with the above arrangement, as illustrated in FIGS. 6 and 7, only the upper cover body 53 made of resin is present above the GNSS antenna 26, and there is no radio wave shield. Therefore, for example, unlike a case where the inertial measurement unit 25 is placed above the GNSS antenna 26, the inertial measurement unit 25 is not a hindrance for reception at the GNSS antenna 26, and carrier phases from a predetermined number of positioning satellites 45 (satellite positioning information) can be reliably received.

Further, as described above, since the first predetermined distance L1 between the GNSS antenna 26 and the inner surface 53a of the upper cover body 53 of the unit cover 51 is set to 30 mm or more, radio interference due to the close proximity between the GNSS antenna 26 and the inner surface 53a of the unit cover 51 is suppressed, thereby making it possible to improve the detection accuracy of the current position information of the tractor 1 acquired from the reception signal of the GNSS antenna 26.

As illustrated in FIGS. 6 to 8, at one end in the longitudinal direction of the base plate 55 (the right end in the left-right direction of the vehicle body unit 2 with respect to the forward direction), a housing 27A of the wireless communication unit (an example of a wireless communication device built in the antenna unit 50) 27 provided with two wireless communication antennas 28 in the left-right direction is fixedly coupled by fifth bolts 62. The two wireless communication antennas 28 of the wireless communication unit 27 are placed in parallel in the front part of the base plate 55 and along the longitudinal direction of the base plate 55. With this arrangement, a sufficient distance from the two wireless communication antennas 28 to the front of the cabin frame 200 (see FIG. 4), which is a metal component of the tractor 1, can be secured.

Further, the two wireless communication antennas 28 of the wireless communication unit 27 make it possible to increase the speed of communication with the wireless communication device 31 of the wireless communication terminal 30. In addition, since the two wireless communication antennas 28 are placed in parallel in the front part of the base plate 55 and along the longitudinal direction of the base plate 55, it is less likely for both the wireless communication antennas 28 to be affected by radio wave shielding by the cabin frame 200 being a metal component of the tractor 1, so that a satisfactory communication of the wireless communication unit 27 can be maintained.

Further, the outer periphery of the inertial measurement unit 25 is shielded by the metal housing 25A at many portions except for a connector and the like, and the metal hat-shaped first bracket 60 located between the wireless communication unit 27 and the inertial measurement unit 25, functions as a shielding wall. Accordingly, radio interference between the wireless communication unit 27 and the inertial measurement unit 25 can be suppressed.

As illustrated in FIGS. 6, 7, and 9, at the other end in the longitudinal direction of the base plate 55 (the left end in the left-right direction of the vehicle body unit 2 with respect to the forward direction), the base station antenna (an example of a wireless communication device built in the antenna unit 50) 29 configured to receive information from the reference station 40 is placed. As a result, the wireless communication unit 27, the GNSS antenna 26 (the inertial measurement unit 25), and the base station antenna 29 are placed on the base plate 55 in this order from the right in the left-right direction of the vehicle body unit 2 with respect to the forward direction to be arranged in a line in the left-right direction of the vehicle body unit 2. As illustrated in FIGS. 6, 7, and 9, the base station antenna 29 includes a base 29A including a magnet 65 and a round bar-shaped antenna bar 29B extending upward from the base 29A.

Further, as illustrated in FIGS. 6, 7 and 9, a raising part 95 configured to place the base station antenna 29 in a higher place than the antenna mounting part is provided between the base station antenna 29 and the antenna mounting part of the base plate 55. As illustrated in FIGS. 6 and 7, the raising part 95 includes a raising bracket 96 formed by bending a metal plate twice at right angles. The raising bracket 96 includes a mounting board part 96a in a horizontal posture fixedly coupled to the other end of the base plate 55 in the longitudinal direction by sixth bolts 97 and sixth nuts 98, a raising plate part 96b extending in a vertical posture upward from one end of the mounting board part 96a, and an antenna mounting plate part 96c horizontally extending from the upper end of the raising plate part 96b.

In the above arrangement of the base station antenna 29, a separation distance between the antenna bar 29B of the base station antenna 29 located at the other end in the longitudinal direction and the wireless communication antenna 28 of the wireless communication unit 27 located at one end in the longitudinal direction is large. Accordingly, it is possible to suppress radio interference between the antenna bar 29B of the base station antenna 29 and the wireless communication antenna 28 of the wireless communication unit 27.

In addition, it is possible to easily mount the base station antenna 29 on the raising bracket 96 made of metal by the magnetic force of the magnet 65 provided in the base 29A. Moreover, the upper end part of the base station antenna 29 can be placed in a higher place by the height of the raising bracket 96, and thus, it is possible to improve the reception performance with respect to the reference station wireless communication device 41 of the reference station 40 while preventing the base station antenna 29 from breaking due to swinging caused by traveling vibration and the like of the tractor 1, as compared with a case where a long base station antenna 29 is used.

Next, the unit cover 51 of the antenna unit 50 will be described.

As illustrated in FIGS. 6 to 9, in a front half on one end side in the longitudinal direction (the right end side in the left-right direction of the vehicle body unit 2 with respect to the forward direction) of the upper cover body 53 of the unit cover 51, a bulge part 53A protruding upward from the upper surface position at the center in the longitudinal direction of the upper cover body 53 and the upper end positions of both wireless communication antennas 28 of the wireless communication unit 27 is formed. Further, as illustrated in FIGS. 6 and 8, a second predetermined distance L2 between an inner surface 53b of the bulge part 53A and the upper ends of the wireless communication antennas 28 is set to 30 mm or more.

The second predetermined distance L2 formed between the upper end of the wireless communication antenna 28 and the inner surface 53b of the bulge part 53A of the upper cover body 53 makes it possible to suppress radio interference due to the close proximity between the wireless communication antenna 28 and the inner surface 53b of the unit cover 51. Accordingly, it is possible to improve the communication accuracy between the wireless communication unit 27 and the wireless communication device 31 of the wireless communication terminal 30.

Further, as illustrated in FIG. 9, a through hole 70 through which the antenna bar 29B of the base station antenna 29 penetrates and which protrudes outward and upward is formed in the other end part of the upper cover body 53 in the longitudinal direction. As illustrated in FIGS. 6, 7, and 9, a vibration-proof elastic body 71 such as a tube lubber contacting an outer peripheral surface of a penetration part of the antenna bar 29B of the base station antenna 29 is attached to the periphery of the opening of the through hole 70. A grommet which contacts the entire circumference of the antenna bar 29B and also exhibits water tightness is employed for the vibration-proof elastic body 71.

If the vibration-proof elastic body 71 is not provided, an annular gap is present between the periphery of the opening of the through hole 70 of the upper cover body 53 and the outer peripheral surface of the penetration part of the antenna bar 29B. If traveling vibration of the tractor 1 or the like acts on the base station antenna 29, the antenna bar 29B swings in the range of the annular gap, which may result in breakage of the antenna bar 29B at its root. However, in the present embodiment, as described above, since a vertical middle part of the antenna bar 29B is supported by the vibration-proof elastic body 71 provided in the periphery of the opening of the through hole 70 of the upper cover body 53 so that the support structure of the base station antenna 29 is a two-point support structure as a whole, it is possible to prevent the antenna bar 29B from breaking due to traveling vibration or the like.

It is noted that, in the embodiment, the vibration-proof elastic body 71 is attached to the periphery of the opening of the through hole 70 of the upper cover body 53, but the vibration-proof elastic body 71 may be attached to the upper surface or the inner surface 53a of the upper cover body 53.

Figure 10:
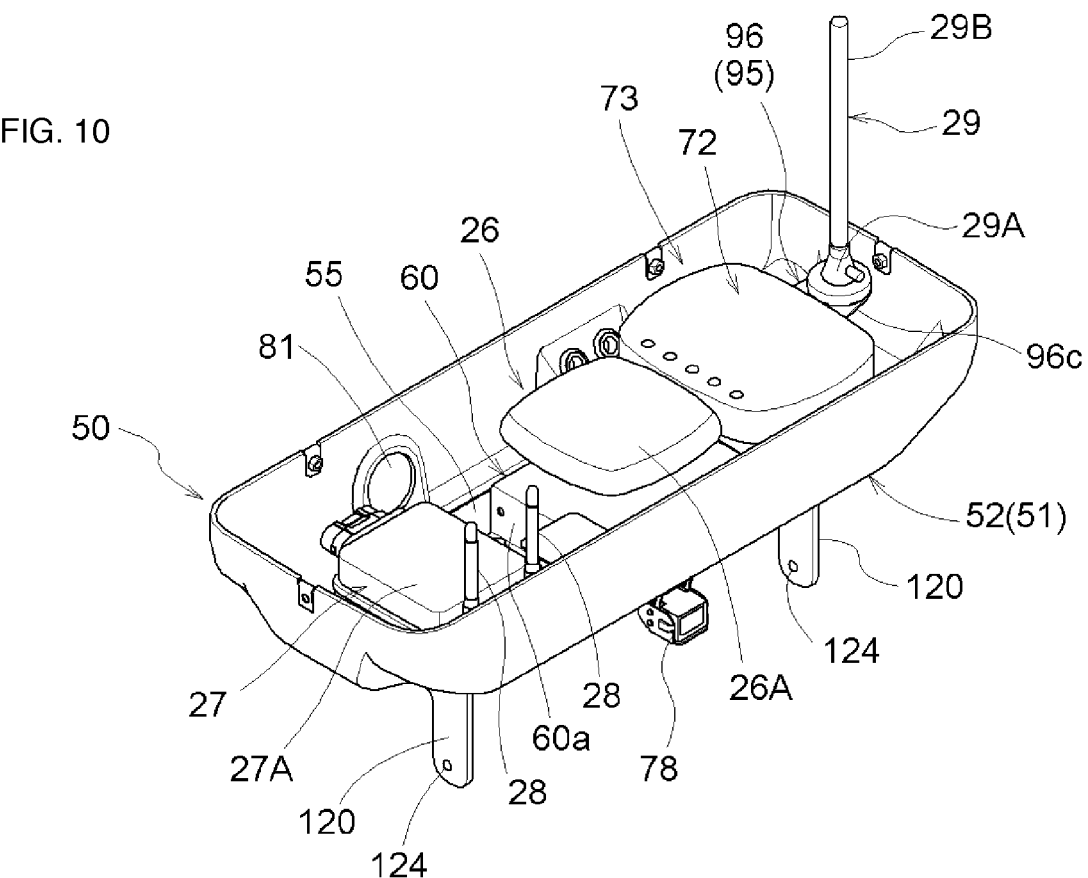
FIG. 10 is a perspective view of the antenna unit with another unit mounted and the cover removed.
Figure 11:
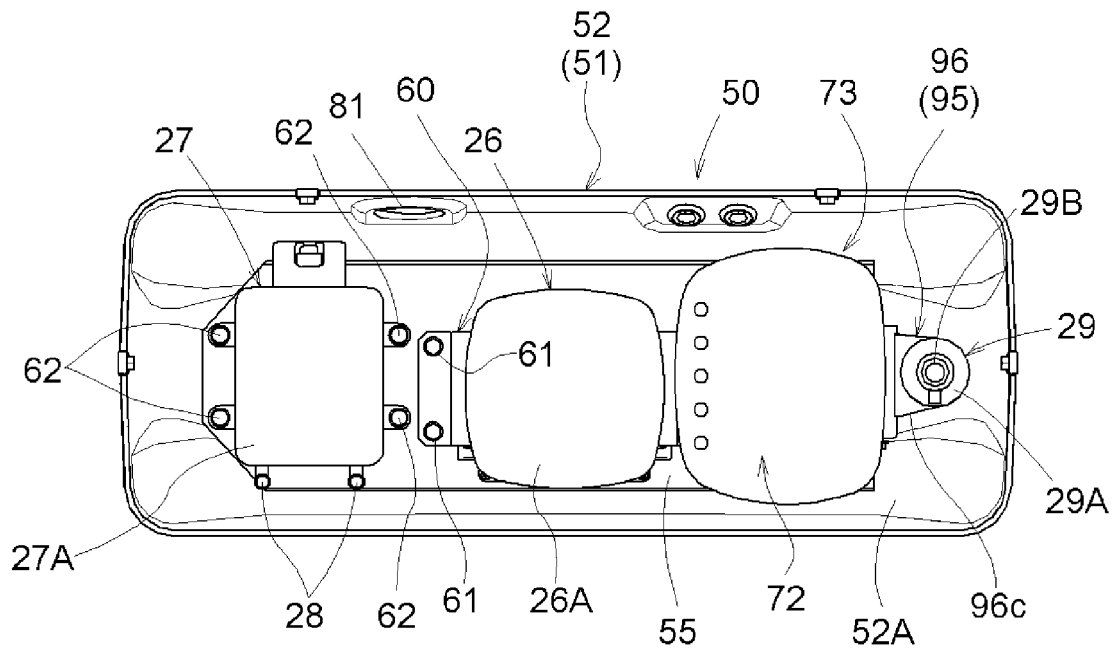
FIG. 11 is a plan view of the antenna unit with the other unit mounted and the cover removed.

As illustrated in FIGS. 6, 10, and 11, a mounting space 73 is formed for another unit 72 between both the inertial measurement unit 25 and the GNSS antenna 26 and the base station antenna 29 on the other end side in the longitudinal direction of the base plate 55. Here, FIGS. 6, 7, and 9 illustrate a state in which the other unit 72 is not mounted in the mounting space 73 and the mounting space 73 is a hollow space. FIGS. 10 and 11 illustrate a state in which the other unit 72 is mounted in the mounting space 73.

The other unit 72 may be, for example, a controller for a retrofit liquid crystal monitor configured to control a part of the automatic traveling control, or the like. In the tractor 1 following the automatic traveling specification according to the present embodiment, a liquid crystal monitor 47 is provided in the cabin 7, and the liquid crystal monitor 47 is equipped with a controller configured to control a part of the automatic traveling control. However, if another work vehicle such as a rice transplanter following a normal specification is changed to follow the automatic traveling specification, a controller configured to control the automatic traveling for a retrofit liquid crystal monitor is required. In this case, the controller can be easily mounted by using the mounting space 73 secured in the base plate 55.

Further, as illustrated in FIGS. 6 and 7, the camera 78 (see FIGS. 3 and 9) for capturing an image of an area in front of the vehicle body is placed at the lower ends of the both second screw members 93 protruding from the bottom plate part 52A of the lower cover body 52. A mounting bracket (not illustrated) for the camera 78 is fixedly coupled to the second screw members 93 by bolts (not illustrated) screwed from below. It is configured such that the image captured by the camera 78 can be displayed on the touch panel of the wireless communication terminal 30 via wireless communication between the wireless communication unit 27 of the tractor 1 and the wireless communication device 31 of the wireless communication terminal 30.

It is noted that, in FIGS. 6 to 11, wires connected to the inertial measurement unit 25, the GNSS antenna 26, the wireless communication unit 27, and the base station antenna 29 which are built on the base plate 55 are omitted. FIGS. 3 and 4 illustrate a part of one harness 80 in which the wires are assembled in the unit cover 51. As illustrated in FIG. 4, the harness 80 is led out from a harness lead-out hole 81 (see FIG. 9) formed at the center in the longitudinal direction of the rear wall of the lower cover body 52. A grommet (not illustrated) is mounted on the harness lead-out hole 81.

Next, a mounting structure of the antenna unit 50 will be described. As illustrated in FIGS. 1 and 3 to 5, both ends of the support frame 100 of the antenna unit 50 are fixedly coupled to mirror mounting parts 150 provided on left and right front supports 201 constituting the cabin frame 200.

As illustrated in FIGS. 3 to 5, in each of the left and right mirror mounting parts 150, a mounting base 151 formed in a substantially "U" shape in a plan view is fixed to the upper part of each of the front supports 201 by welding or the like, and a mirror mounting member 152 having a hinge for rotatably supporting a support arm 111 of a rearview mirror 110 is fixedly coupled to the mounting base 151 by a bolt (not illustrated).

A second bracket 112 extending upward (specifically, directly above) when viewed from the side of the vehicle body is fixedly fastened by a bolt between each of the left and right mounting bases 151 and each of the left and right mirror mounting members 152. The second bracket 112 includes a vertical support plate part 112a extending upward from between the mounting base 151 and the mirror mounting member 152, a mounting plate part 112b bent along a horizontal plane from the upper end of the vertical support plate part 112a, and a reinforcing plate part 112c fixed to a bent corner formed by the vertical support plate part 112a and the mounting plate part 112b.

As illustrated in FIGS. 3 to 5, the support frame 100 includes a pipe-shaped support member 101 having a circular cross section formed by bending both ends in the left-right width direction downward in a substantially flat gate shape when viewed from the front of the vehicle body. Mounting plates 102 having a substantially "L"-shape when viewed from the front of the vehicle body and having a mounting lower surface along a horizontal plane are fixed to both ends of the pipe-shaped support member 101. Reinforcing plates 103 are fixed to both end parts of the pipe-shaped support member 101 and both the mounting plates 102.

Both the mounting plates 102 of the support frame 100 are placed on the upper surfaces of the mounting plate parts 112b of the left and right second brackets 112 which are each fixedly fastened between the mounting base 151 and the mirror mounting member 152. Both the placed mounting plates 102 of the support frame 100 and the mounting plate parts 112b of both the second brackets 112 are fixedly coupled to each other by seventh bolts 104 and seventh nuts 105, respectively.

As described above, the left and right mirror mounting parts 150 are mounted on the upper part of the front supports 201 of the rigid cabin frame 200, and are placed at a height close to a roof 190 of the cabin 7. Accordingly, with no more than adding a simple support structure in which both the mirror mounting parts 150 which are sturdy and have a high ground height are used and the second brackets 112 extend upward (specifically, directly above) from both the mirror mounting parts 150, it is possible to firmly mount the support frame 100 of the antenna unit 50 at an appropriate height.

In addition, the upper mounting surface of the mounting plate part 112b of each of the left and right second brackets 112, which is fixedly fastened between the mounting base 151 and the mirror mounting member 152, and the lower mounting surface of each of the mounting plates 102 of the support frame 100 are both formed on a horizontal plane. Accordingly, this makes it easy to place a middle part of the pipe-shaped support member 101 horizontally along the left-right direction, which makes it possible to reduce an error in mounting of the antenna unit 50 mounted on the horizontal middle part of the pipe-shaped support member 101.

Further, as illustrated in FIGS. 3 to 5, in a state where the support frame 100 is laid between the left and right second brackets 112, the horizontal middle part of the pipe-shaped support member 101 of the support frame 100 is horizontally placed along the left-right width direction of the vehicle body at a position above and near the front end of the roof 190 of the cabin frame 200.

As illustrated in FIGS. 3 to 5, a pair of left and right third brackets 120, each having a substantially "L"-shape when viewed from the side of the vehicle body, which support the pair of right and left coupling members 91 of the antenna unit 50 are fixed to the horizontal middle part of the pipe-shaped support member 101. Vertical coupling plate parts 91b of both the coupling members 91 facing close to each other in the left-right width direction of the vehicle body unit 2 on the antenna unit 50 side, and both the third brackets 120 on the support frame 100 side are fixedly coupled by two eighth bolts 121 horizontally along the left-right width direction of the vehicle body unit 2 and eighth nuts 122.

In a state where the vertical coupling plate parts 91b of both the coupling members 91 on the antenna unit 50 side are fixedly coupled to both the third brackets 120 on the support frame 100 side by two sets of the two eighth bolts 121 and eighth nuts 122, the antenna unit 50 is in a working position (work posture) in which the base station antenna 29 mounted on the antenna unit 50 is oriented vertically.

Circular first bolt insertion holes 126 (see FIG. 16) are formed in two front and rear places of each of the vertical coupling plate parts 91b of each of both the coupling members 91. In each of both the third brackets 120 on the support frame 100 side, a second oblong bolt insertion hole 123 horizontally along the front-rear direction is formed, and the second oblong bolt insertion hole 123 has a length corresponding to the pitch of the first bolt insertion holes 126. In each of both the third brackets 120 on the support frame 100 side, a circular second bolt insertion hole 124 is formed in a part which is located immediately below the front end position of the second oblong bolt insertion hole 123 and at a vertically spaced position corresponding to the pitch of both the first bolt insertion holes 126.

Then, as illustrated in FIG. 4, in a state where the antenna unit 50 is in the working position, the eighth bolt 121 on the front side is removed, and the eighth bolt 121 on the rear side is loosened. In this state, the eighth bolt 121 on the rear side is moved forward along the second oblong bolt insertion hole 123 of each of both the third brackets 120 to the front end position together with the antenna unit 50, and the antenna unit 50 is turned downward around the axis of the eighth bolt 121. In a state in which the antenna unit 50 is turned to the lower front side, the antenna unit 50 hangs down around the eighth bolt 121 as a pivot, so that the first bolt insertion holes 126 on the front end side of both the coupling members 91 on the antenna unit 50 side are aligned with the second bolt insertion holes 124 of both the third brackets 120 on the support frame 100 side (see FIG. 16). The removed eighth bolts 121 are inserted into the aligned first bolt insertion holes 126 and second bolt insertion holes 124, and each of the eighth bolts 121 is screwed to the tightening side so that both the coupling members 91 on the antenna unit 50 side are fixedly coupled to both the third brackets 120 on the support frame 100 side. In this fixed coupling state, as illustrated in FIG. 12, the antenna unit 50 is in a non-working position (non-working posture) where the base station antenna 29 mounted on the antenna unit 50 is directed horizontally in the front side to make its front side lower.

With the configuration described above, the antenna unit 50 is mounted on the support frame 100 to be displaceable from the working position to the non-working position on the lower front side. Further, the second oblong bolt insertion holes 123 of both the third brackets 120, the first bolt insertion holes 126 on the rear end side of both the coupling members 91 on the antenna unit 50 side, and the eighth bolts 121 constitute a guide unit 125 configured to guide the antenna unit 50 to be moved in the front-rear direction between the working position and the non-working position on the lower front side.

Figure 12:
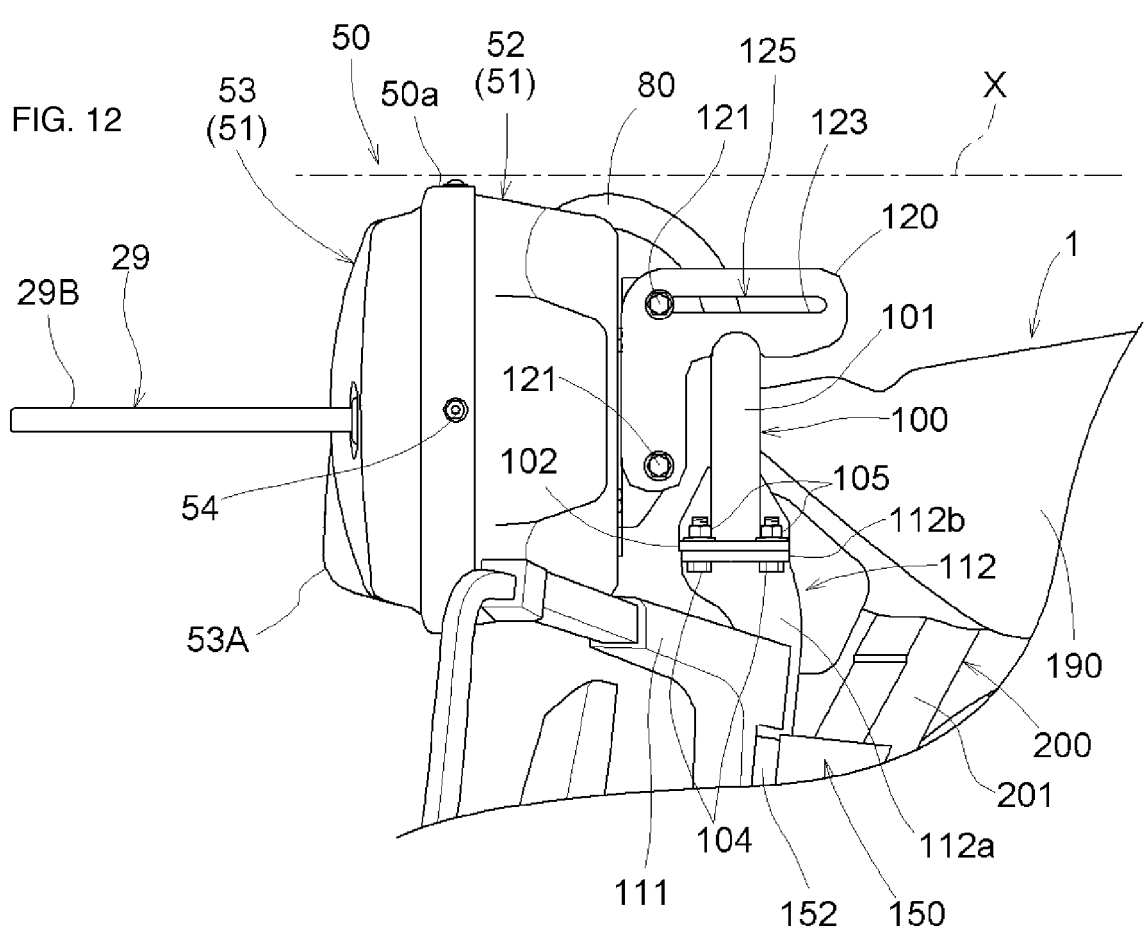
FIG. 12 is a side view the antenna unit changed to a non-working position.
Figure 13:
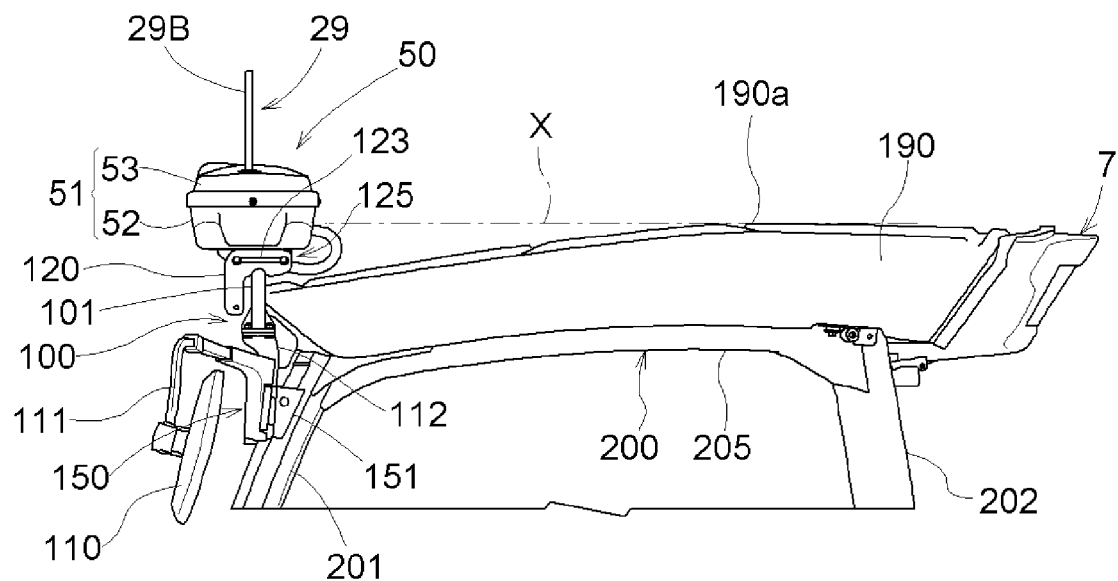
FIG. 13A is a side view illustrating a height relationship between the antenna unit in a working position and a highest part of a cabin.
FIG. 13B is a side view illustrating a height relationship between the antenna unit in the non-working position and the highest part of the cabin.
Figure 13:
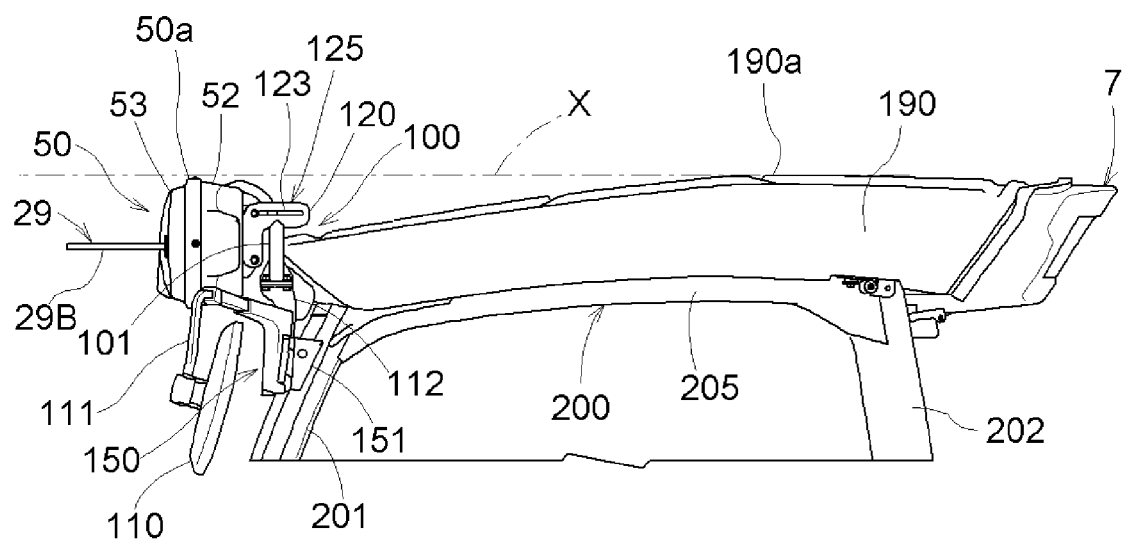

In the present embodiment, as illustrated in FIGS. 12 and 13, the non-working position of the antenna unit 50 is a position where the antenna unit 50 is moved to the front side from the working position to the maximum within the movable range of the bolt in the second oblong bolt insertion hole 123, and where the antenna unit 50 is turned downward by 90 degrees around the eighth bolt 121 contacting the front end position of the second oblong bolt insertion hole 123. In this non-working position, the base station antenna 29 is in a posture of protruding forward in the horizontal direction as described above.

Then, as illustrated in FIGS. 1, 4, and 13A, in a state where the antenna unit 50 is in the working position, the base station antenna 29 and a part of the unit cover 51 of the antenna unit 50 protrude upward from a highest horizontal line X passing through a highest part 190a of the roof 190 of the cabin 7. However, when the base station antenna 29 protruding upward from the roof 190 of the cabin 7 is obstructed during transportation of the tractor 1 or the like, the antenna unit 50 is changed from the working position to the non-working position on the lower front side as illustrated in FIGS. 12 and 13B. In this non-working position, the base station antenna 29 is in a posture of protruding forward in the horizontal direction, which makes it possible to place the antenna unit 50 including the unit cover 51 at a position substantially equal to or lower than the highest part 190a of the top surface of the roof 190 of the cabin 7. In the present embodiment, as illustrated in FIGS. 12 and 13B, when the antenna unit 50 is in the non-working position, the upper side surface of the opening joint part of the upper cover body 53 is a highest part 50a of the antenna unit 50. The highest part 50a of the antenna unit 50 in the non-working position is set at the same height position as the highest horizontal line X passing through the highest part 190a of the roof 190 of the cabin 7.

Further, in the present embodiment, the operation of changing the position of the antenna unit 50 between the working position and the non-working position is performed manually, but the operation of changing the position of the antenna unit 50 may be performed by a drive unit such as an actuator.

Whether the antenna unit 50 is in the working position can be detected based on displacement information acquired from the inertial measurement unit 25. Accordingly, as illustrated in FIG. 2, the control unit 23 includes an automatic traveling restraint unit 46 configured to prohibit the start of the automatic traveling control based on information acquired by the inertial measurement unit 25 and the GNSS antenna 26 during no detection of the antenna unit 50 in the working position.

The above-described automatic traveling restraint unit 46 allows the automatic traveling control to be started only when the antenna unit 50 is in the working position. Accordingly, it is possible to allow the vehicle body to automatically and safely travel along the target traveling route with high accuracy based on accurate information acquired by the inertial measurement unit 25 and the GNSS antenna 26.

It is noted that, in the present embodiment, whether the antenna unit 50 is in the working position is detected based on the displacement information acquired from the inertial measurement unit 25, but whether the antenna unit 50 is in the working position may be determined based on a signal of an automatic switch for detecting a position displacement of the antenna unit 50 or a signal of a hard switch manually operated.

Next, a wiring structure of the harness 80 led out from the antenna unit 50 will be described.

Figure 14:
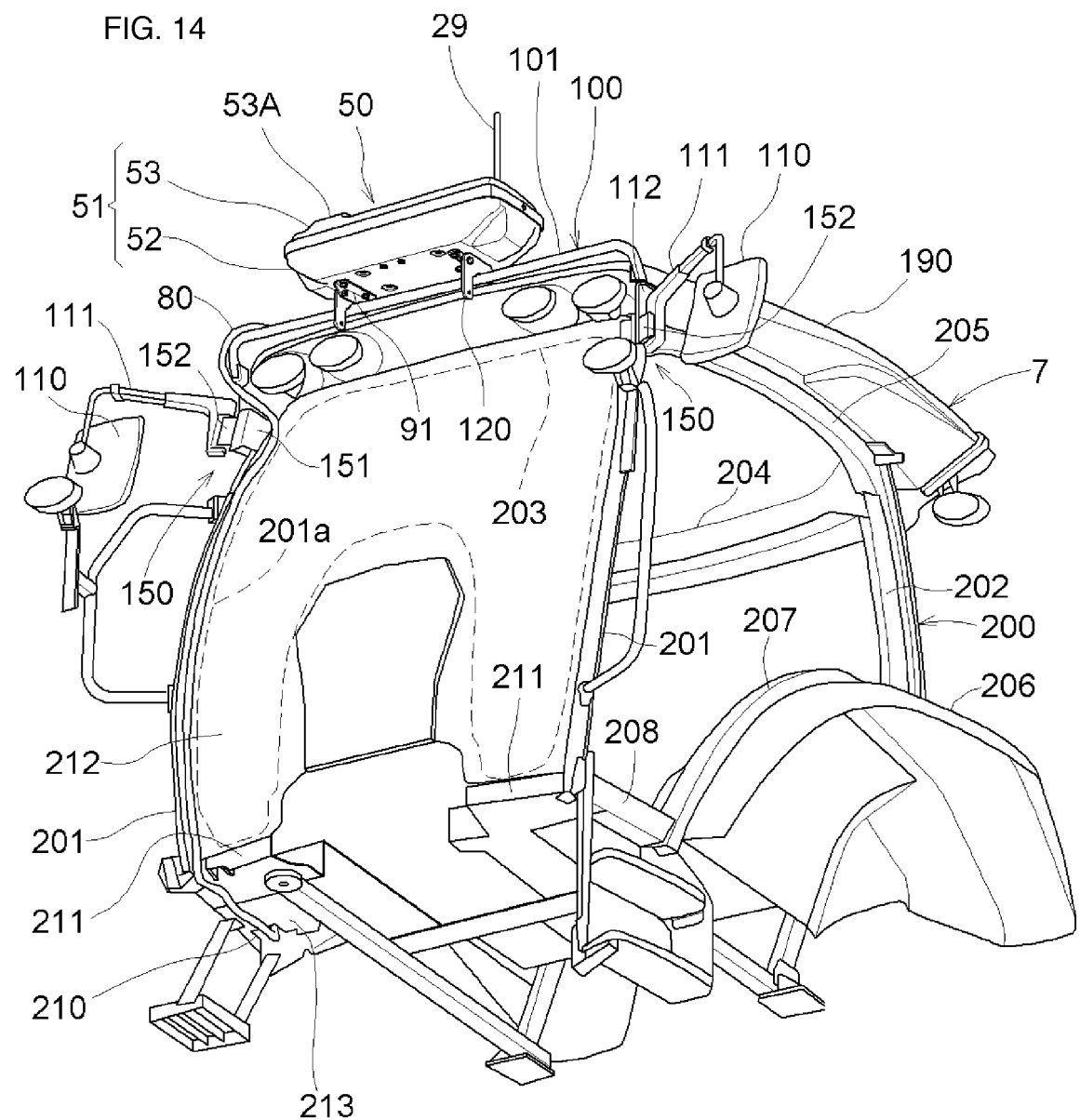
FIG. 14 is a perspective view of the cabin at an elevation angle.
Figure 15:
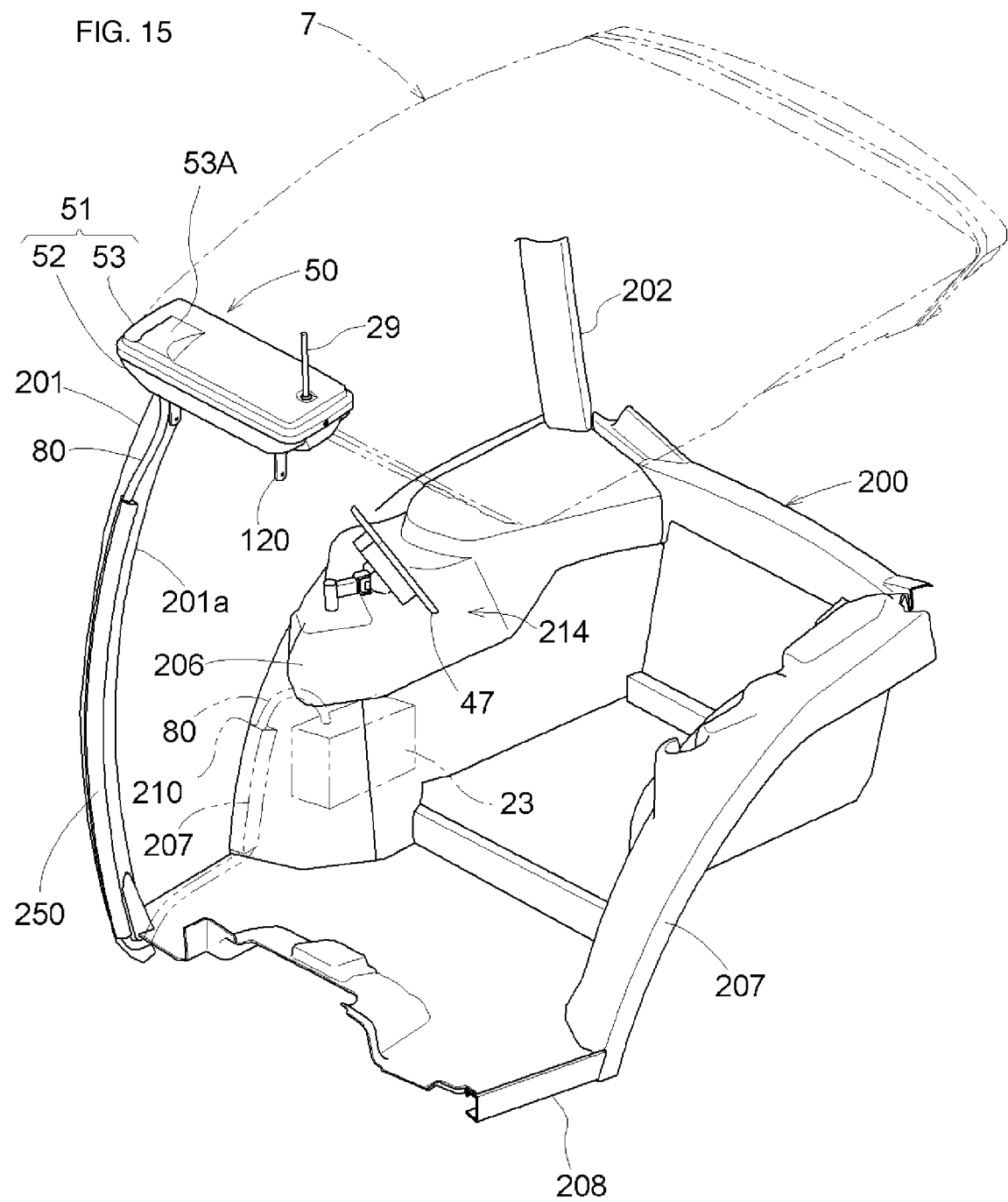
FIG. 15 is a perspective view of a main part of the cabin.

As illustrated in FIGS. 14 and 15, the cabin frame 200 in which the harness 80 is wired is formed in a substantially box frame shape that includes a pair of left and right front supports 201 located in front of the driver's seat 9 (see FIG. 1), a pair of left and right rear supports 202 located behind the driver's seat 9, a front beam member 203 coupling the upper ends of the front supports 201, a rear beam member 204 coupling the upper ends of the rear supports 202, and left and right side beam members 205 each coupling the upper ends of the front supports 201 and the rear supports 202 which are arranged in front and rear.

As illustrated in FIGS. 14 and 15, the lower end of each of the rear supports 202 is coupled to an upper rear end part of a fender frame 207 curved to bulge rearward and upward in a side view to conform to the shape of a rear fender 206, and a lower front end part of the fender frame 207 is coupled to the rear end of a side frame 208 protruding rearward from a lower part of the corresponding one of the front supports 201.

As illustrated in FIG. 14, the fender frame 207 is formed of a cylindrical frame material. Among them, the lower front part of the fender frame 207 located on the right side of the cabin 7 opens downward and outward of the cabin 7, and an internal space of the fender frame 207 located on the right side is formed in an inside and outside communication passage 210 communicating the inside and outside of the cabin 7. A drain hose (not illustrated) for discharging dew water in an air conditioner to the outside of the cabin 7 is provided in the inside and outside communication passage 210 of the fender frame 207.

Further, a windshield 212 is placed in a region surrounded by the left and right front supports 201, the front beam members 203, and lower front plate boards 211 extending inward from the lower ends of the front supports 201 in the left and right direction.

Then, as illustrated in FIGS. 14 and 15, the harness 80 led out from the antenna unit 50 extends in a right edge (an example of one edge in the left-right width direction) on the outer surface of the windshield 212 of the cabin 7 and downward along a band-shaped part overlapping a glass receiving part 201a of the front support 201 on the right side. The harness 80 reaching one of the lower front plate boards 211 on the lower end side of the windshield 212 extends rearward along the lower surface of a floor plate support plate 213 continuously connected to the side frame 208, is then guided into the cabin 7 from the opening at the lower front end of the fender frame 207 located on the right side at the lower front end through the inside and outside communication passage 210, and is connected to the control unit 23 placed in an operation panel unit 214 on the right side.

The band-shaped part overlapping the glass receiving part 201a of the front support 201 on the right side and being at a right side edge on the outer surface of the windshield 212 is a glass attaching part for attaching the windshield 212 to the front part of the cabin 7, and is also in a position that does not interfere with viewing. Therefore, when the harness 80 led out from the antenna unit 50 is placed in the above-described band-shaped part, it is possible to place the harness 80 in a good appearance while maintaining the visibility of an operator seated on the driver's seat 9 in a good condition.

Further, as illustrated in FIG. 15, a protective harness cover 250 made of resin through which the harness 80 is inserted is adhered to the band-shaped part at the right side edge of the windshield 212 on the outer surface of the windshield 212 with an adhesive or the like.

Another Embodiment

Figure 16:
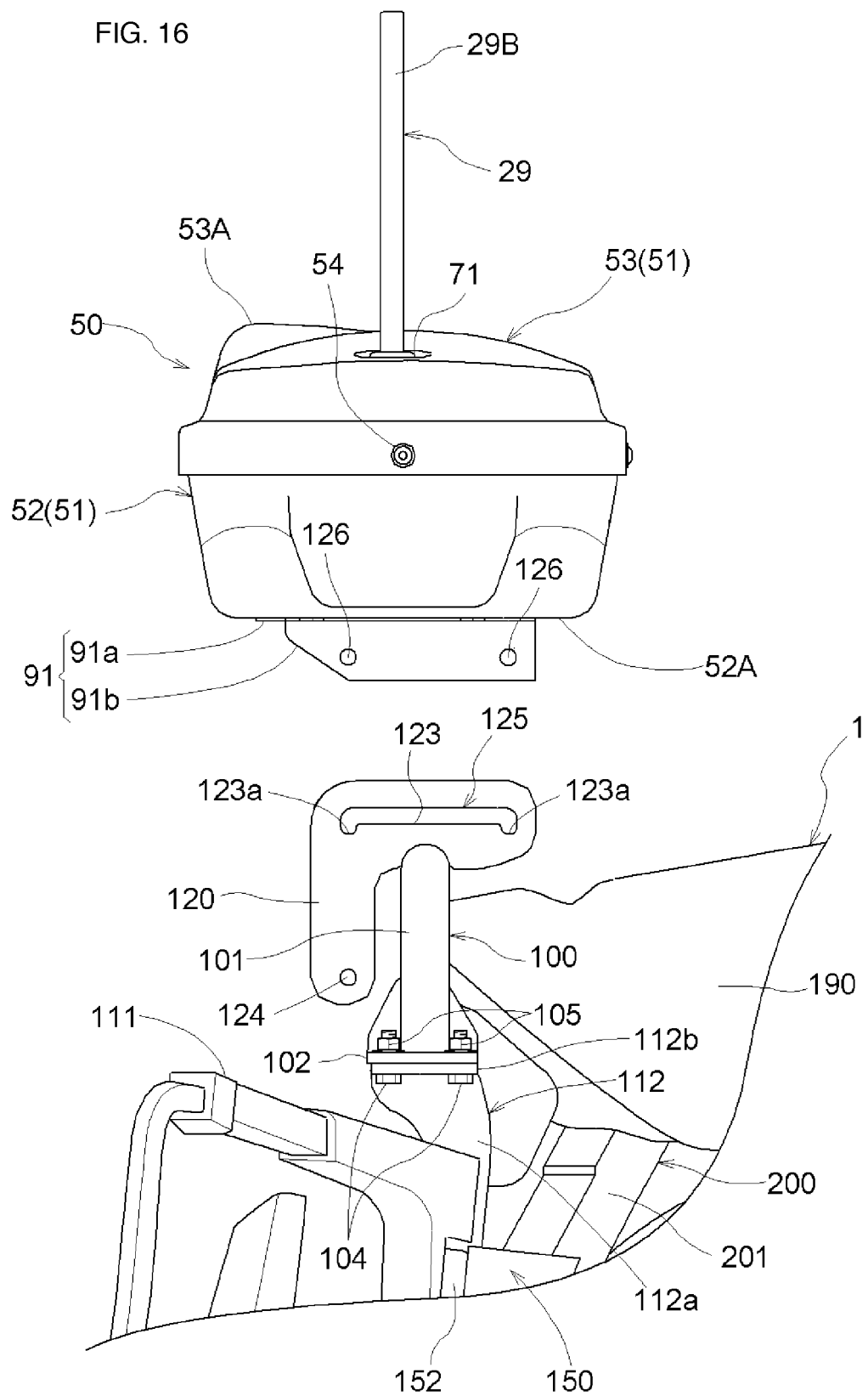
FIG. 16 is an exploded side view of an antenna unit mounting part according to another embodiment.

In the above-described embodiment, the second oblong bolt insertion holes 123 of both the third brackets 120 of the support frame 100 are formed in a straight line along the front-rear direction. However, as illustrated in FIG. 16, recesses 123a, each receiving the eighth bolts 121 inserted through the first bolt insertion hole 126 and the second bolt insertion hole 124 on the lower side, may be formed at both ends in the front-rear direction of each of the second oblong bolt insertion holes 123.

Then, when the antenna unit 50 is changed from the working position to the non-working position on the lower front side, the eighth bolt 121 on the front side is first removed, and the eighth bolt 121 on the rear side is loosened. In this state, the eighth bolts 121 located in the recesses 123a on the rear end side of the second oblong bolt insertion holes 123 are pulled up and moved forward together with the antenna unit 50. The moved eighth bolts 121 are dropped into the recesses 123a on the front end side of the second oblong bolt insertion holes 123, and the antenna unit 50 is turned downward around the axis of the eighth bolts 121. At this time, since the eighth bolts 121 are securely held in the recesses 123a on the front end side of the second oblong bolt insertion holes 123, the antenna unit 50 is easily turned around the axis of the eighth bolts 121.

In a state in which the antenna unit 50 is turned to the lower front side, the antenna unit 50 hangs down around the eighth bolts 121 as a pivot, so that the first bolt insertion holes 126 on the front end side of both the coupling members 91 on the antenna unit 50 side are aligned with the second bolt insertion holes 124 of both the third brackets 120 on the support frame 100 side. The removed eighth bolts 121 are inserted into the aligned first bolt insertion holes 126 and second bolt insertion holes 124, and each of the eighth bolts 121 is screwed to the tightening side so that both the coupling members 91 on the antenna unit 50 side are fixedly coupled to both the third brackets 120 on the support frame 100 side. In this fixed coupling state, the antenna unit 50 is in a non-working position (non-working posture) where the base station antenna 29 mounted on the antenna unit 50 is directed horizontally in the front side to make its front side lower.

OTHER EMBODIMENTS (1) In the above-described embodiments, the wireless communication antenna 28 of the wireless communication unit 27 is housed inside the unit cover 51 of the antenna unit 50. However, as required, the wireless communication antenna 28 may protrude outward and upward from a through hole formed in the upper cover body 53.

(2) In the above-described embodiments, the first predetermined distance L1 between the GNSS antenna 26 and the inner surface 53a of the upper cover body 53 of the unit cover 51 is set to 30 mm or more. However, the first predetermined distance L1 can be set to any value according to the reception state of carrier phases (satellite positioning information) from a predetermined number of positioning satellites 45.

(3) In the above-described embodiments, the second predetermined distance L2 between the inner surface 53b of the bulge part 53A of the unit cover 51 and the upper ends of the wireless communication antennas 28 is set to 30 mm or more. However, the second predetermined distance L2 can be set to any value according to the communication state between the wireless communication unit 27 and the wireless communication device 31 of the wireless communication terminal 30.

(4) In the above-described embodiments, the pair of left and right coupling members 91 are mounted on the lower surface side of the unit cover 51. However, the mounting structure is not limited to this, and any mounting structure can be adopted according to the mounting condition on both sides of the work vehicle.

(5) In the above-described embodiments, the two wireless communication antennas 28 of the wireless communication unit 27 are placed in parallel. However, a single wireless communication antenna 28 may be used, or three or more wireless communication antennas 28 may be used to be placed in parallel.

(6) In the above-described embodiments, the raising part 95 is composed of the raising bracket 96 formed by bending a metal plate twice at right angles, but it is not limited to this structure. The raising part 95 may have any structure as long as the base station antenna 29 can be placed in a higher place than the antenna mounting part.

INDUSTRIAL APPLICABILITY

The present invention is preferably applicable to a work vehicle with a cabin, and in particular, a work vehicle suitable in automatic traveling (including self-driving) of the work vehicle such as a tractor along a target traveling route while acquiring position information of the work vehicle by using a Global Navigation Satellite System (GNSS), and applicable also to an antenna unit for a work vehicle.

DESCRIPTION OF REFERENCE NUMERALS

1 Work vehicle (tractor)
7 Cabin
25 Inertial measurement unit
26 GNSS antenna
27 Wireless communication device (wireless communication unit)
29 Wireless communication device (base station antenna)
40 Reference station
46 Automatic traveling restraint unit
50 Antenna unit
51 Unit cover
55 Unit base (base plate)
72 Another unit
73 Mounting space
95 Raising part 100 Support frame
112 Bracket (second bracket)
125 Guide unit
190a Highest part
200 Cabin frame
L1 Distance (first predetermined distance)

The invention claimed is:

1. An antenna unit for a work vehicle, in which a GNSS antenna and an inertial measurement unit are placed at a longitudinal center of a unit base mountable onto a work vehicle,
a wireless communication unit is placed at one end side in a longitudinal direction of the unit base,
a wireless communication antenna of the wireless communication unit is placed in a front part of the unit base, which is located on a front side of a vehicle body when the unit base is mounted on the work vehicle, and
the GNSS antenna is provided above the inertial measurement unit.

2. The antenna unit for a work vehicle according to claim 1, wherein a plurality of the wireless communication antennas are placed in the front part of the unit base and in parallel in the longitudinal direction of the unit base.

3. The antenna unit for a work vehicle according to claim 1, wherein a distance between the GNSS antenna and an inner surface of a unit cover configured to cover the unit base is set to 30 mm or more.

4. The antenna unit for a work vehicle according to claim 1, wherein a base station antenna configured to receive information from a reference station is placed on the other end side in the longitudinal direction of the unit base, and a raising part configured to place the base station antenna at a place higher than an antenna mounting part of the unit base is provided between the base station antenna and the antenna mounting part.

5. The antenna unit for a work vehicle according to claim 1, wherein a mounting space for another unit is formed on the other end side in the longitudinal direction of the unit base.

6. A work vehicle with a cabin, wherein
a support frame extending in a left-right width direction at an upper position outside the cabin is fixed to brackets extending upward from both right and left sides of a cabin frame, and an antenna unit in which an inertial measurement unit, a GNSS antenna, and a wireless communication device are built is built in the support frame in a state where the inertial measurement unit and the GNSS antenna are placed at a substantially center position in a left-right width direction of a vehicle body, and
the antenna unit is configured as the antenna unit for a work vehicle according to claim 1.

7. The work vehicle according to claim 6, wherein the antenna unit is mounted to be displaceable from a working position to a non-working position on a lower front side with respect to the support frame, and a guide unit configured to guide the antenna unit to be moved in a front-rear direction between the working position and the non-working position is provided.

8. The work vehicle according to claim 6, wherein the antenna unit is mounted to be displaceable from a working position to a non-working position on a lower side with respect to the support frame, and the antenna unit is placed at a position substantially equal to or lower than a highest part of a top surface of the cabin in a state where the antenna unit is displaced to the non-working position on the lower side.

* * * * *